United States Patent
My Ali et al.

(10) Patent No.: US 7,101,754 B2
(45) Date of Patent: Sep. 5, 2006

(54) TITANIUM SILICATE FILMS WITH HIGH DIELECTRIC CONSTANT

(75) Inventors: El Khakani My Ali, Saint-Lambert (CA); Sarkar Dilip K., Montreal (CA); Luc Ouellet, Granby (CA); Daniel Brassard, Montreal (CA)

(73) Assignee: DALSA Semiconductor Inc., Waterloo (CA)

( * ) Notice: Subject to any disclaimer, the term of this patent is extended or adjusted under 35 U.S.C. 154(b) by 0 days.

(21) Appl. No.: 10/864,472

(22) Filed: Jun. 10, 2004

(65) Prior Publication Data

US 2005/0277304 A1    Dec. 15, 2005

(51) Int. Cl.
*H01L 21/8242* (2006.01)

(52) U.S. Cl. ............. 438/240; 438/261; 438/287; 438/768; 438/782; 438/785

(58) Field of Classification Search ......... 438/240, 438/261, 287, 768, 782, 785
See application file for complete search history.

(56) References Cited

U.S. PATENT DOCUMENTS

| | | | |
|---|---|---|---|
| 4,849,296 A * | 7/1989 | Haluska et al. | 428/457 |
| 4,997,482 A * | 3/1991 | Haluska et al. | 106/287.16 |
| 5,270,267 A | 12/1993 | Ouellet | |
| 5,320,983 A | 6/1994 | Ouellet | |
| 5,447,613 A | 9/1995 | Ouellet | |
| 5,457,073 A | 10/1995 | Ouellet | |
| 5,470,798 A | 11/1995 | Ouellet | |
| 5,753,945 A * | 5/1998 | Chivukula et al. | 257/295 |
| 6,078,493 A * | 6/2000 | Kang | 361/303 |
| 6,083,805 A | 7/2000 | Ouellet et al. | |
| 6,268,620 B1 | 7/2001 | Ouellet et al. | |
| 6,300,144 B1 * | 10/2001 | Wouters et al. | 438/3 |
| 6,352,889 B1 * | 3/2002 | Nishitsuji | 438/240 |
| 6,365,266 B1 * | 4/2002 | MacDougall et al. | 428/304.4 |
| 6,562,408 B1 | 5/2003 | Costa et al. | |
| 7,026,694 B1 * | 4/2006 | Ahn et al. | 257/410 |
| 2003/0011016 A1 * | 1/2003 | Agarwal et al. | 257/310 |
| 2003/0129315 A1 | 7/2003 | Suyal et al. | |
| 2004/0003627 A1 * | 1/2004 | Hashima et al. | 65/33.2 |
| 2004/0004982 A1 * | 1/2004 | Eisler et al. | 372/43 |

FOREIGN PATENT DOCUMENTS

EP    0433915 A1    6/1991

OTHER PUBLICATIONS

Brassard, D. et al: High-k titanium silicate thin films grown by reactive magnetron sputtering for CMOS.

"Deposition of thick silica-titania sol-gel films on Si substrates", R.R.A. Syms et al., Journal of Non-Crystalline Solids 170 (1994) London, UK, 1994 Elsevier Science B.V., XP-002361077, pp. 223-233.

* cited by examiner

Primary Examiner—Lynne A. Gurley
(74) Attorney, Agent, or Firm—Marks & Clerk; Richard J. Mitchell

(57) ABSTRACT

A method of making a film with a high dielectric constant uses a spin-on sol-gel process to deposit the film on a substrate, the film having a composition $(SiO_2)_x(TiO_2)_{1-x}$, where $0.50 < x < 0.75$. The resulting film is annealed in an oxygen-containing atmosphere at a temperature lying in the range of 500° C. to 700° C.

22 Claims, 40 Drawing Sheets

The hydrolysis and the condensation reaction in the sol-gel process

Figure 2
Gel time and solution pH for TEOS
systems employing different catalysts
(C. J. Brinker and G. S. Scherer, "Sol-gel Science"
page 119, Academic Press, New York, 1990 )

| Catalyst | Concentration (mole:TEOS) | Initial pH of solution | Gelation time (h) |
| --- | --- | --- | --- |
| HF | 0.05 | 1.9 | 12 |
| HCl | 0.05 | 0.05 | 92 |
| $HNO_3$ | 0.05 | 0.05 | 100 |
| $H_2SO_4$ | 0.05 | 0.05 | 106 |
| $NH_4OH$ | 0.05 | 9.95 | 107 |
| No Catalyst | - | 5 | 1000 |

Figure 3
Rate constant k for acid hydrolysis of tetraalkosysilanes Si(RO)4 at 20°C

| R (Alkyl) | K |
|---|---|
|  | $10^2$ ( $mol^{-1}s^{-1}[H^+]^{-1}$ ) |
| $C_2H_5$ | 5.1 |
| $C_4H_9$ | 1.9 |
| $C_6H_{13}$ | 0.83 |
| $(CH_3)_2CH(CH_2)_3CH(CH_3)CH_2$ | 0.31 |

Recipe for synthesizing titanium silicate films
(50% TiO2 and 50% SiO2 molar composition)

Figure 5
Amount of precursor and the refluxing time for the synthesis of various titanium silicate $(TiO_2)_x(SiO_2)_{1-x}$ thin films with different proportion of $SiO_2$ with $TiO_2$

| Molar % of $TiO_2$ | Molar % of $SiO_2$ | TBOT ($10^{-3}$ mole) | TEOS ($10^{-3}$ mole) | $C_2H_5OH$ ($10^{-3}$ mole) | 0.1 M HCl ($10^{-3}$ mole) | Reflux time (Minutes) |
|---|---|---|---|---|---|---|
| 100 | 0 | 11.26 | 0 | 87 | $H_2O$=1.1　HCl=0 | 0 |
| 75 | 25 | 26.8 | 8.96 | 393 | $H_2O$=20.2　HCl=3.93×10$^{-2}$ | 30 |
| 63 | 37 | 23.06 | 13.44 | 191 | $H_2O$=35.3　HCl=6.3×10$^{-2}$ | 30 |
| 50 | 50 | 22.4 | 22.4 | 220 | $H_2O$=22.2　HCl=4×10$^{-2}$ | 120 |
| 37 | 63 | 18.25 | 31.08 | 231 | $H_2O$=37.8　HCl=6.8×10$^{-2}$ | 90 |
| 75 | 25 | 11.94 | 35.84 | 452 | $H_2O$=37.8　HCl=6.8×10$^{-2}$ | 120 |
| 0 | 100 | 0 | 22.2 | 87 | $H_2O$=22.2　HCl=4×10$^{-2}$ | 120 |

FTIR pattern of different titanium silicate films produced by sol-gel

Si 2p in depth of different compounds
produced by sol-gel techniques

Figure 8
Binding energy of electron
of different elements in different compounds.

| Molar % SiO$_2$ | Binding Energy (eV) | | | |
|---|---|---|---|---|
| | O 1s | Si 2p | Ti 2p3/2 | |
| 100 | 533 | 103.5 | | |
| 75 | 532 | 103.2 | 459.8 | |
| 50 | 531.2 | 103.0 | 458.7 | |
| 25 | 530.5 | 102.7 | 458.3 | |
| 0 | 530.2 | | 458.2 | |

O 1s in depth of different compounds produced by sol-gel techniques

Ti 2p in depth of different compounds produced by sol-gel techniques

Figure 11
Dielectric constant and leakage current of TiSiOx films
annealed at different temperatures

| Annealing temperature | K at 1 kHz | K at 1 MHz | Average K at 1 MHz | Leakage current at 0.1 MV/cm (A/cm$^2$) |
|---|---|---|---|---|
| 400°C | 130 | 22.66 | (23 ± 1) | 6.8E-7 |
| 500°C | 108 | 24.65 | | 4.6E-7 |
| 600°C | 25 | 21.87 | | 2.1E-7 |
| 700°C | 33.6 | 22.93 | | 2.0E-5 |
| 750°C | 34.0 | 24.16 | | 4.9E-4 |
| 800°C | 36.24 | 22.92 | | 1.6E-4 |

Dielectric constant with frequency in different annealing temperatures

Dissipation factor with frequency
in different annealing temperatures

Dielectric constant with frequency in different annealing temperatures

Dissipation factor with frequency in different annealing temperatures

Leakage current with electric field
at different annealing temperatures

Leakage current with annealing temperature
at the electric field of 0.1 MV/cm

Dielectric constant with aging time
for the films prepared using TBOT:TEOS=1:1

Dissipation factor with aging time
for the films prepared using TBOT:TEOS=1:1

Dielectric constant with aging time for 1 MHz and 1 kHz

Dissipation factor with aging time for 1 MHz and 1 kHz

J-E characteristics of TiSiO film with different aging time

Leakage current density at 0.1 MV/cm electric filed with different aging time

Dielectric constant with frequency for TiSiO film with TiO2:SiO2=3:1

Dissipation factor with frequency
for TiSiO film with TiO2:SiO2=3:1

Dielectric constant with aging time at 1 kHz and 1 MHz
for TiSiO film with TiO2:SiO2=3:1

Dissipation factor with aging time at and 1 MHz for TiSiO film with TiO2:SiO2=3:1

J-E characteristics of Ti3SiOx film with different aging time for TiSiO film with TiO2:SiO2=3:1

Leakage current density at 100 kV/cm electric filed with different aging time with TiO2:SiO2=3:1

Dielectric constant with frequency for TiSiO film with TiO2:SiO2=1:3

Dissipation factor with frequency
for TiSiO film with TiO2:SiO2=1:3

Dielectric constant with aging time at 1 kHz and 1 MHz
for TiSiOx film with TiO2:SiO2=1:3

Dissipation factor with aging time at and 1 MHz
for TiSiOx film with TiO2:SiO2=1:3

J-E characteristics of TiSi3Ox film with different aging time for TiSiOx film with TiO2:SiO2=1:3

Leakage current density at 100 kV/cm electric field with different aging for TiSiOx films with TiO2:SiO2=1:3

Figure 36
Average dielectric constant and leakage current for different samples
with variation of TiO2 and SiO2 in the films

| molar %SiO2 | K at 1 MHz | Error at K | J at 0.1 MV/cm |
|---|---|---|---|
| 0 | 60 | 4 | 3.02E-02 |
| 25 | 37 | 3 | 5.90E-03 |
| 37 | 23 | 1.9 | 3.20E-04 |
| 50 | 22 | 1.8 | 2.10E-07 |
| 63 | 8 | 2 | 2.00E-09 |
| 75 | 10.5 | 2.2 | 2.50E-09 |
| 100 | 3.9 (assumed) | 1 | (Not measured) |

Dielectric constant with frequencies
of different silicate films

Leakage current density with applied electric field of different silicate films

Variation of the current density with the electrical field for silicate films with various amount of SiO2 in the films Variation of leakage current
for silicate films with various amount of SiO2 in the films

TITANIUM SILICATE FILMS WITH HIGH DIELECTRIC CONSTANT

FIELD OF THE INVENTION

This invention relates to the fabrication of integrated devices, and in particular to the fabrication in such devices of films with high dielectric constant. Such devices may, for example, include analog CMOS devices, high voltage CMOS devices, and intelligent MEMS devices.

BACKGROUND OF THE INVENTION

High dielectric constant materials with high bulk resistivity are needed to reduce the size of capacitors in analog CMOS devices, to reduce the size of the high voltage capacitors in charge pumps of high voltage CMOS devices and to reduce the size of capacitors of intelligent MEMS devices.

Many materials have been investigated to produce these materials, including barium strontium titanate (BST), lead zirconate titanate (PbZrO3-PbTiO3, PZT) and other such high dielectric constant materials.

Unfortunately, even if these materials can achieve high dielectric constants, they generally have a leakage current higher then about 1 $\mu A/cm^2$ when exposed to an electrical field higher than about 0.1 MV/cm.

Various titanium silicate thin films have been deposited using pulsed laser deposition (PLD): D. K. Sarkar, E. Desbiens, and M. A. El Khakani, Appl. Phys. Lett. 80, 294 (2002).

More recently, the deposition technique migrated to radio-frequency magnetron sputtering of a $TiO_2/SiO_2$ composite target in a reactive O2/Ar gas atmosphere. This technique allowed the deposition of titanium silicate thin films with a dielectric constant as high as 20 and a low leakage current density of about 1 mA/cm2 at 0.1 MV/cm: D. Brassard, D. K. Sarkar, M. A. El Khakani, and L. Ouellet, (JUST submitted).

Other researchers have also published on the deposition of titanium silicates using the radio-frequency sputtering:
Nishiyama, A. Kaneko, M. Koyama, Y. Kamata, I. Fujiwara, M. Koike, M. Yoshiki and M. Koike, Mat. Res. Soc. Symp. Proc. 670, K4.8.1 (2001)
M. Koyama, A. Kaneko, M. Koike, I. Fujiwara, M. Yabuki, M. Yoshiki, M. Koike, and A. Nishiyama, Mat. Res. Soc. Symp. Proc. 670, K4.7.1 (2001)
X. Wang, H. Masumoto, and Y. Someno, T. Hirai, Thin Solid Films 338, 105 (1999)
M. F. Ouellette, R. V. Lang, K. L. Yan, R. W. Bertram, and R. S. Owles, J. Vac. Sci. Technol. A9, 1188 (1991)
R. P. Netterfield, P. J. Martin, C. G. Pacey, and W. G. Sainty, J. Appl. Phys. 66, 1805 (1989)

Spin-on technologies have been patented by DALSA Semiconductor to deposit high quality dielectrics as described in the following patents: Luc Ouellet, U.S. Pat. No. 5,470,798 Moisture-free SOG process; Luc Ouellet, U.S. Pat. No. 5,457,073 Multi-level interconnection CMOS devices with SOG; Luc Ouellet, U.S. Pat. No. 5,447,613 Preventing of via poisoning by glow discharge induced desorption; Luc Ouellet, U.S. Pat. No. 5,364,818 SOG with moisture resistant protective capping layer; Luc Ouellet, U.S. Pat. No. 5,320,983 Spin-on glass processing technique for the fabrication of semiconductor devices; and Luc Ouellet, U.S. Pat. No. 5,270,267 Curing and passivation of spin on glasses by a plasma process wherein an external polarization field is applied to the substrate.

DALSA Semiconductor has described techniques to achieve high value capacitors in semiconductor devices (indicating the need to go toward $TiO_2$-like materials in combination with $SiO_2$): U.S. Pat. No. 6,268,620, Method of forming capacitors on integrated circuit; and U.S. Pat. No. 6,083,805, Method of forming capacitors in a semiconductor device The spin-on sol-gel technique of deposition of titanium silicates has been reported by various investigators:
Y. Sorek, R. Reisfeld, I. Finkelstein, and S. Ruschin, Appl. Phys. Lett. 63, 3256 (1993)
X. Orignac, D. Barbier, X. M. Du, and R. M. Almeida, Appl. Phys. Lett. 69, 895 (1996)
A. M. Seco, M. C. Gongalves, and R. M. Almeida, Mater. Sci. Eng., B76, 193 (2000)

However, these studies merely investigate the structural and optical properties of titanium silicate films.

SUMMARY OF THE INVENTION

The inventors have found that the structural, chemical and electrical properties of spin-on sol-gel synthesized titanium silicate thin films, when suitably annealed, are suitable for use in. CMOS, high voltage CMOS and intelligent MEMS devices incorporating at least one high voltage device operating at a voltage at more than 5 volts.

According to a first aspect of the invention there is provided a method of making a film with a high dielectric constant comprising using a spin-on technique to apply said film made by a sol-gel process onto a substrate, said film having a composition $(SiO_2)_x(TiO_2)_{1-x}$, where $0.50<x<0.75$; and annealing the resulting film in an oxygen-containing atmosphere, preferably at a temperature lying in the range of about 500° C. to 700° C.

An annealing temperature of about 600° C. has been found to give particularly good results.

The invention also provides a method of synthesizing a titanium silicate film with high dielectric constant comprising mixing precursors for said titanium silicate film to create a sol, said precursors being selected to form titanium silicate having a composition $(SiO_2)_x(TiO_2)_{1-x}$, where $0.50<x<0.75$; forming a gel from said sol; applying said gel to a substrate using a spin-on technique to form a coating; drying said coating to form said titanium silicate film; and annealing said titanium silicate film in an oxygen-containing atmosphere, preferably at a temperature lying in the range of about 500° C. to 700° C.

The preferred precursors are tetrabutyloxytitanium and tetramethoxysilane although other precursors capable of forming titanium silicate with the specified composition could be used.

The gel is normally formed by aging the sol. The aging time can vary and depends on the nature of the actual materials used to form the gel, but in the preferred system using an acid catalyst, TEOS and TBOT, the optimum aging time lies in the range of about 70 to 100 hours, with about 70 hours being preferred. However, in other systems the aging time could be considerably longer.

The invention still further provides an integrated device incorporating a dielectric film comprising an annealed titanium silicate film having a composition $(SiO_2)_x(TiO_2)_{1-x}$, where $0.50<x<0.75$.

The titanium silicate film in accordance with embodiments of the invention has a dielectric constant between 10–50 at frequencies between 1 kHz and 1 MHz; a dissipation factor between 0.001 and 0.1 at frequencies between 1 kHz and 1 MHz; and a leakage current ranging 1 nA/cm$^2$ and 1 μA/cm$^2$ at an applied field between 0.1 MV/cm and 1 MV/cm.

The inventors have found that the spin-on technique for titanium silicates is an excellent method of achieving high quality and high dielectric constant dielectrics for such high value capacitors. Among its advantages is the fact that:

- It requires much less capital than the radio-frequency sputtering technique;
- It is capable of much higher throughput than the radio-frequency sputtering technique;
- It is capable of a self-planarizing effect on topography, which is an advantage if the titanium silicates are to be deposited on an integrated circuit already having high aspect ratio patterns. This factor is important since advanced CMOS, high voltage CMOS and/or intelligent MEMS devices generally have important surface topography and reactive sputtering is not well adapted to deposit such titanium silicates in the deep valleys formed by this important topology; i.e., the step coverage of reactively sputtered titanium silicates is generally very poor and preclude their use into such advanced devices;
- It allows a spin-on material from a liquid source and then much less prone to pin-holing following the evaporation of solvents;
- It allows two consecutive coats to be used as for the second coat to cover the residual pin-holes of the first coat;
- It is a very flexible technique to achieve well-oxidized TiO$_2$/SiO$_2$ alloys of various compositions.

BRIEF DESCRIPTION OF THE DRAWINGS

The invention will now be described in more detail, by way of example only, with reference to the accompanying drawings, in which:

FIG. 2 shows the Gel time and solution pH for TEOS systems employing different catalysts (C. J. Brinker and G. S. Scherer, "Sol-gel Science" page 119, Academic Press, New York, 1990);

FIG. 3 shows the rate constant k for acid hydrolysis of tetraalkosysilanes Si(RO)4 at 20° C.;

FIG. 5 shows the amount of precursor and the refluxing time for the synthesis of various titanium silicate (TiO$_2$)x (SiO$_2$)$_{1-x}$ thin films with different proportion of SiO$_2$ with TiO$_2$;

FIG. 8 shows the binding energy of electron of different elements in different compounds;

FIG. 11 shows the dielectric constant and leakage current of TiSiOx films annealed at different temperatures;

FIG. 36 shows the average dielectric constant and leakage current for different samples with variation of TiO$_2$ and SiO$_2$ in the films

DETAILED DESCRIPTION OF THE PREFERRED EMBODIMENTS

Sol-gel techniques were used to synthesize titanium silicate films (hereafter referred to as TiSiO$_4$, TiSiO$_y$ or (SiO$_2$)$_x$(TiO$_2$)$_{1-x}$ mixed oxides). The values of x were chosen as 0.25, 0.33, 0.5, 0.66 and 0.75. FTIR and XPS support the formation of Ti—O—Si bonding in all the silicate films irrespective of the value of x.

The titanium silicate films were deposited on a substrate using conventional spin-on techniques referred to above.

The deposited silicate films were annealed at 400° C., 500° C., 600° C., 700° C., 750° C. and 800° C. for a titanium silicate compound of $(SiO_2)_x(TiO_2)_{1-x}$ with x is equal to 0.5 (i.e., $TiSiO_4$). The obtained average dielectric constant at 1 MHz is 23 (±1). The minimum leakage current at 0.1 MV/cm field is 2.1E−7 A/cm$^2$ for the samples annealed at 600° C. Further prepared samples were annealed at 600° C. with x and the aging time of the sol varied.

The average dielectric constant with various aging time (from 3 hrs to 160 hrs) for x=0.5 was found to be 20.5 (±1.5) at 1 MHz. The minimum-leakage current density at 0.1 MV/cm was 2.0E−7 A/cm$^2$ for samples produced from a sol which was aged for ~70 hrs.

The average dielectric constant for titania-rich silicate films (i.e., x=0.25 or 75% (molar) of $TiO_2$) was found to be of about 40 at 1 MHz and the average leakage current 5.8E−3 A/cm$^2$ at 0.1 MV/cm. In contrast, the average dielectric constant of silica-rich films (i.e., $(SiO_2)_{0.75}(TiO_2)_{0.25}$ molar) is of ~11 at 1 MHz, while they exhibit a very low leakage current density of 3.6E−9 A/cm$^2$ at 0.1 MV/cm. The lowest leakage current of 4E−8 A/cm$^2$, at 1 MV/cm, is obtained for the films obtained from the sol which has been aged for ~160 hrs.

The sol-gel process, as the name implies, involves the evolution of inorganic networks through the formation of a colloidal suspension (sol) and gelation of the sol to form a network in a continuous liquid phase (gel). The precursors for synthesizing these colloids consist of a metal or metalloid element surrounded by various reactive ligands. Metal alkoxides are most popular because they react readily with water. The most widely used metal alkoxides are the alkoxysilanes, such as tetramethoxysilane (TMOS) and tetraethoxysilane (TEOS). However, other alkoxides such as aluminates, titanates, and borates are also commonly used in the sol-gel process, often mixed with TEOS.

Figure 1:
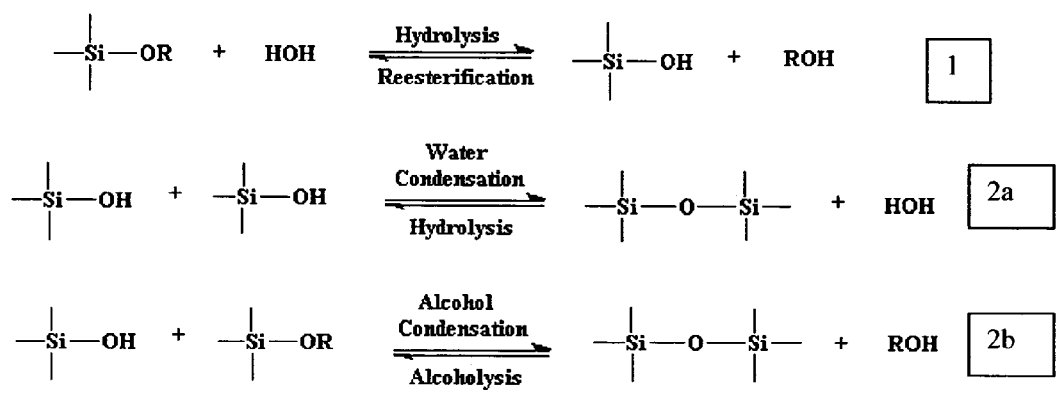
FIG. 1 shows the hydrolysis and the condensation reaction in the sol-gel process.

At the functional group level, three reactions are generally used to describe the sol-gel process: hydrolysis, alcohol condensation, and water condensation. This general reaction scheme can be seen in FIG. 1. However, the characteristics and properties of a particular sol-gel inorganic network are related to a number of factors that affect the rate of hydrolysis and condensation reactions, such as, pH, temperature and time of reaction, reagent concentrations, catalyst nature and concentration, $H_2O/Si$ molar ratio (R), aging, temperature and time, and drying. Of the factors listed above, pH, nature and concentration of catalyst, $H_2O/Si$ molar ratio (R), and temperature have been identified as most important. Thus, by controlling these factors, it is possible to vary the structure and properties of the sol-gel-derived inorganic networks over wide ranges.

The hydrolysis reaction (Eq. 1 of FIG. 1), through the addition of water, replaces alkoxide groups (OR) with hydroxyl groups (OH). Subsequent condensation reactions (Eqs. 2a and 2b of FIG. 1) involving the silanol groups (Si—OH) produce siloxane bonds (Si—O—Si) plus the by-products water or alcohol. Under most conditions, condensation commences before hydrolysis is complete. However, conditions such as, pH, $H_2O/Si$ molar ratio (R), and catalyst can force completion of hydrolysis before condensation begins. Additionally, because water and alkoxides are immiscible, a mutual solvent such as an alcohol is utilized. With the presence of this homogenizing agent, alcohol, hydrolysis is facilitated due to the miscibility of the alkoxide and water. As the number of siloxane bonds increases, the individual molecules are bridged and jointly aggregate in the sol. When the sol particles aggregate, or inter-knit into a network, a gel is formed. Upon drying, trapped volatiles (water, alcohol, etc.) are driven off and the network shrinks as further condensation can occur. It should be emphasized, however, that the addition of solvents and certain reaction conditions may promote esterification and depolymerization reactions according to the reverse of equations (1), (2a), and (2b) of FIG. 1.

It is clear from the table of FIG. 2, which is taken from the publication C. J. Brinker and G. S. Scherer, "Sol-gel Science" page 119, Academic Press, New York, 1990, that adding the acid or base catalysis in the solution can enhance the gel formation. It is also comprehensible that the time of gel formation is nearly constant for the three commonly used acids (HCl, $HNO_3$ and $H_2SO_4$). In the present invention, we have used HCl as a catalytic agent for the preactivation of tetraethoxysilicon (TEOS) $[Si(OC_2H_5)_4]$.

Steric Effects

Steric (spatial) factors exert the greatest effect on the hydrolytic stability of organoxysilanes. Any complication of the alkoxy group retards the hydrolysis of alkoxysilanes, but the hydrolysis rate is lowered the most by branched alkoxy groups. The effect of alkyl chain length and degree of branched are illustrated in the table of FIG. 3 taken from above reference: C. J. Brinker and G. S. Scherer, "Sol-gel Science" page 119, Academic Press, New York, 1990.

The hydrolysis rate for Si(OEt)4 is $5\times10^{-9}$ mol$^{-1}$s$^{-1}$ and Ti(OR)4 is $1\times10^{-3}$ mol$^{-1}$s$^{-1}$ at pH 7, more than five order of magnitude greater. The condensation rate for Si(OEt)4 is $1\times10^{-4}$ mol$^{-1}$s$^{-1}$ where as for Ti(OEt)4 is 30 mol$^{-1}$s$^{-1}$ was observed for $TiO_2$ formation.

Hydrolysis and condensation rate of titanium precursor is higher than the silicon precursor. However, bigger alkyl size reduces the hydrolysis rate as well as condensation rate. For the present invention, we have chosen tetrabutoxytitanium (TBOT) $[Ti(OC_4H_9)_4]$ having bigger alkyl size ($C_4H_9$) as compared to $C_2H_5$ present in TEOS $[Si(OC_2H_5)_4]$ to have a comparable hydrolysis rate to produce titanium silicate high-k dielectric thin films using sol-gel process.

Precursors

Here is some general information about the precursors used in the sol-gel process to synthesize titanium silicate thin films:

Molar weight of tetrabutoxytitanium(TBOT) $[Ti(OC_4H_9)_4]$ is 339.86 gm and density 0.998 gm/cc;

Molar weight of tetraethoxysilicon (TEOS) $[Si(OC_2H_5)_4]$ is 208 gm and density 0.934 gm/cc;

Molar weight of $C_2H_5OH$ is 46 gm and density 0.80 gm/cc;

Molar weight of $H_2O$ is 18 gm and density 1.0 gm/cc

Recipe

Figure 4:
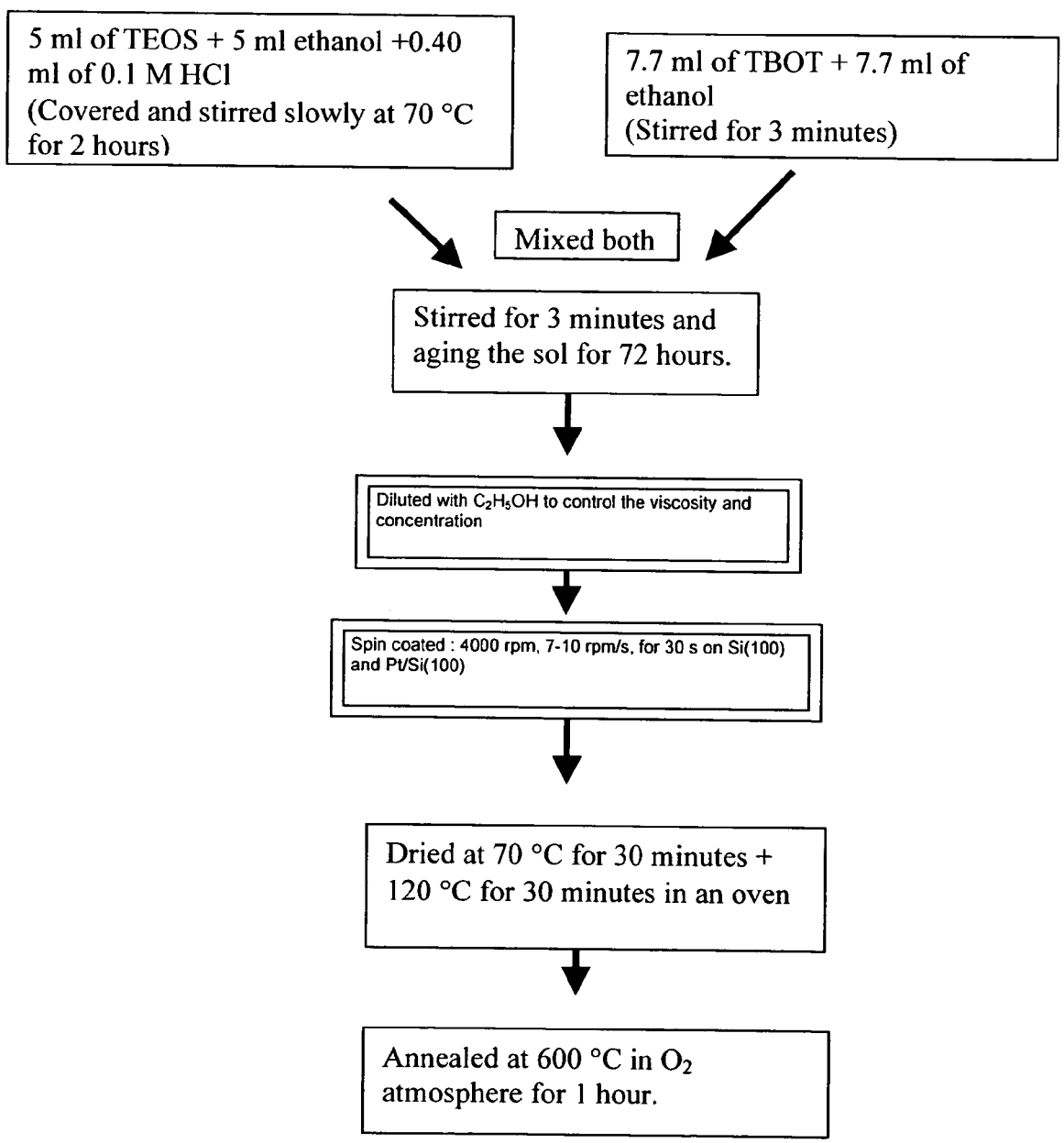
FIG. 4 shows the recipe for synthesizing titanium silicate films (50% TiO2 and 50% SiO2 molar composition)

The recipe used for synthesizing titanium silicate films having 50% $TiO2$ and 50% $SiO_2$ molar composition is shown in FIG. 4.

Results

The recipe of FIG. 4 was used to synthesis $(SiO_2)_x(TiO_2)_{1-x}$ mixed oxides with x=0.5. The obtained thickness of the films was ~200 nm on Pt/Si(100) substrates after annealing at 600° C. The table of FIG. 5 summarizes the amount of precursor used and catalysis as well as the refluxing time to synthesis of various mixed oxides.

FTIR Investigation

Figure 6:
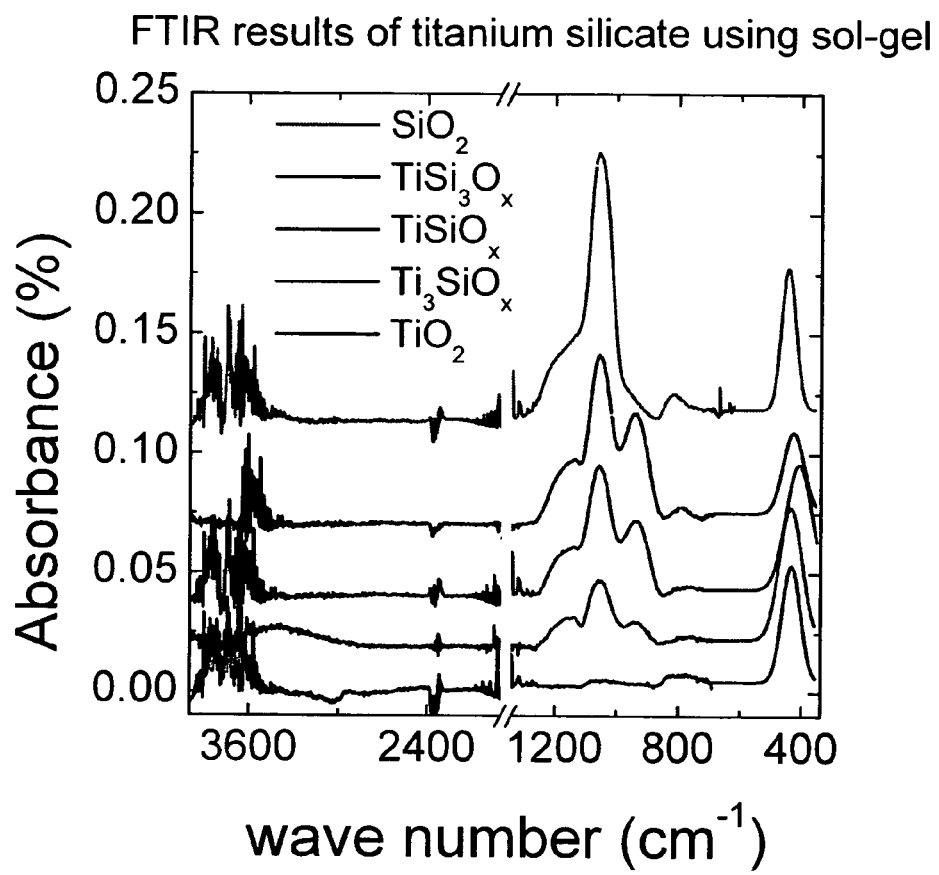
FIG. 6 shows the FTIR pattern of different titanium silicate films produced by sol-gel.

FTIR was used to identify the formation of titanium silicate in the films. Three characteristic peaks of Si—O—Si were observed in the IR spectroscopy for $SiO_2$. These peaks were asymmetric stretching vibration mode at 1080 $cm^{-1}$, bending mode at 810 $cm^{-1}$ and rocking mode at 457 $cm^{-1}$ respectively. On the other hand, the characteristic signature of $TiO_2$ is the appearance of asymmetric stretching vibration of Ti—O—Ti mode at ~440 $cm^{-1}$ which overlaps with the rocking vibration of Si—O—Si mode. All films show the main peak of asymmetric Si—O—Si at 1060 $cm^{-1}$. A distinct peak of Ti—O—Si is observed at 935 $cm^{-1}$, which is the characteristic of the titanium silicate in the films as shown in FIG. 6. The intensity ratio of Ti—O—Si to Si—O—Si peaks is seen to increase when the composition of the films is varied from $TiO_2$ towards $TiSi_3O_x$ (see FIG. 6).

XPS Analysis

Figure 7:
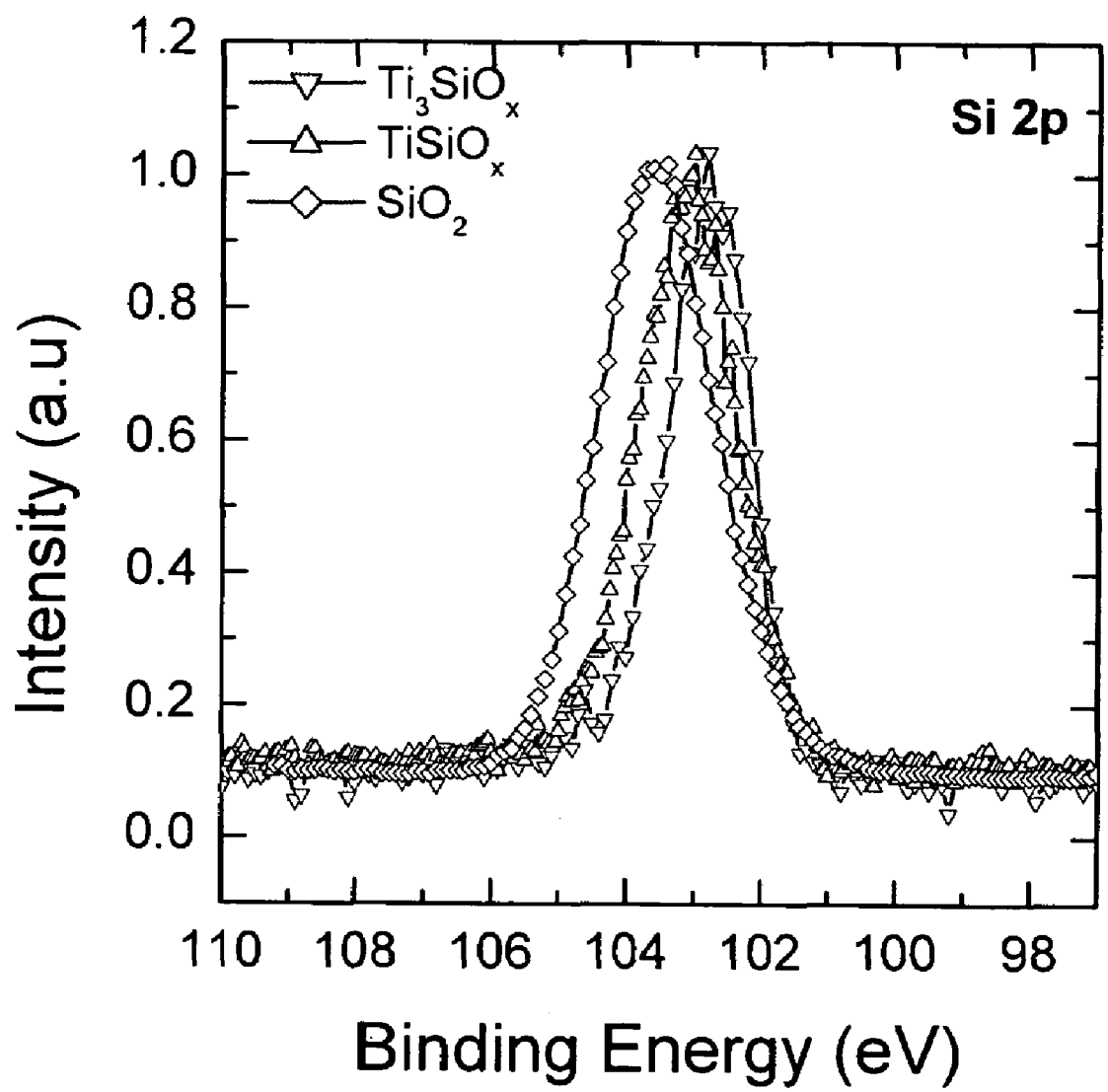
FIG. 7 shows the Si 2p in depth of different compounds produced by sol-gel techniques.

FIG. 7 shows the binding energy of Si 2p in different compounds. Binding energy of Si 2p electron is less in the titanium silicate compound as compared to $SiO_2$.

The table of FIG. 8 summarizes the binding energy of Si 2p in different compounds. Binding energy of Si 2p for pure $SiO_2$ is found to be at 103.5 eV and for a silicate compound of $TiSiO_4$ appears at 103.0 eV. The binding energy of Si 2p further reduces to 102.7 eV for silicate compounds with x=0.75 (i.e., 25% molar of $SiO_2$).

Figure 9:
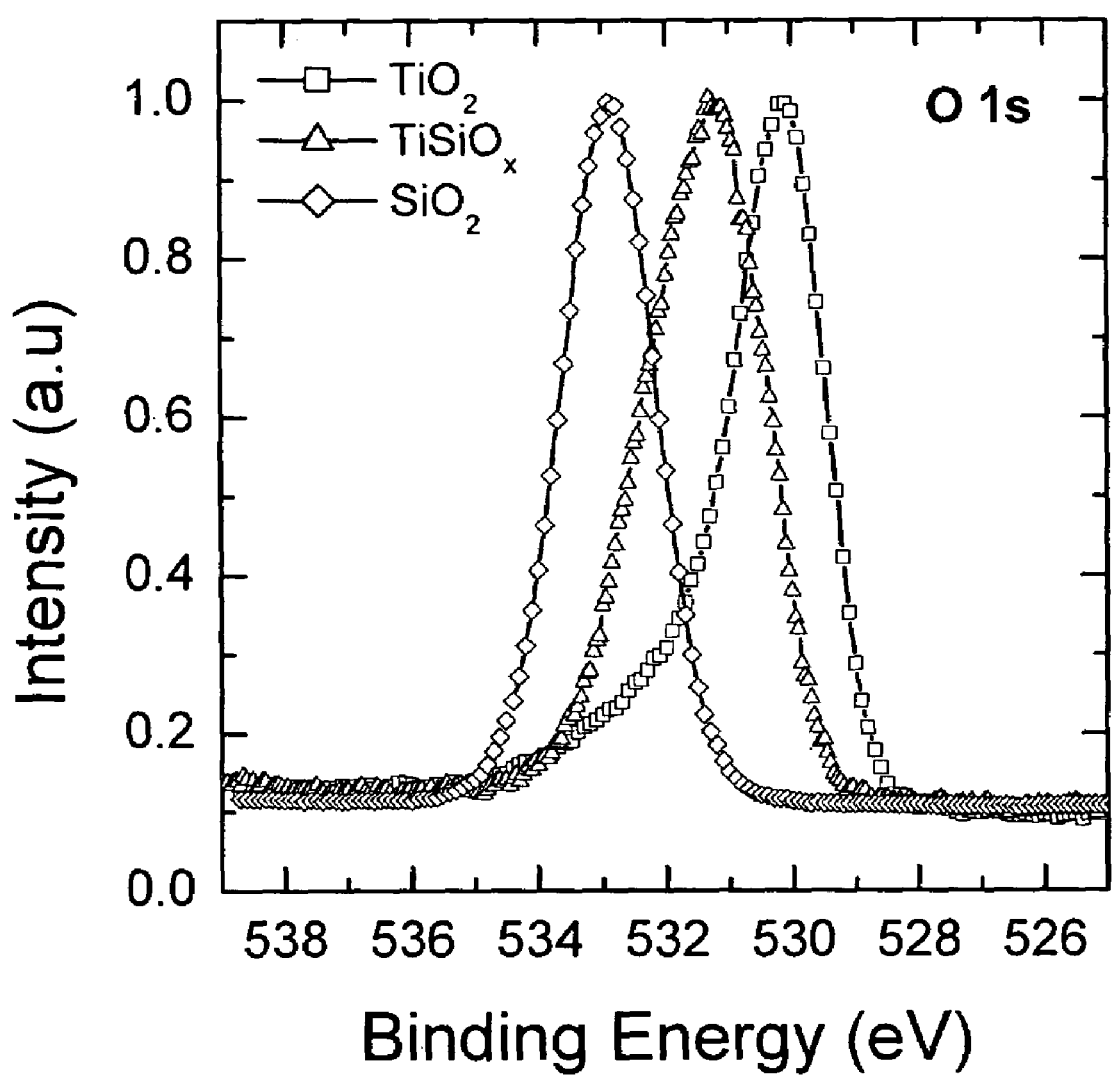
FIG. 9 shows the O 1s in depth of different compounds produced by sol-gel techniques.

Binding energy of O 1s in different silicate films has been presented in FIG. 9. Binding energy of O 1s varies from 530.2 eV to 533 eV, which are the binding energies of $TiO_2$ and $SiO_2$ respectively. The table of FIG. 8 summarizes the binding energy of O 1s with the presence of $SiO_2$ in the samples. The FWHM of O 1s increases with the amount of $SiO_2$ in silicate films.

Figure 10:
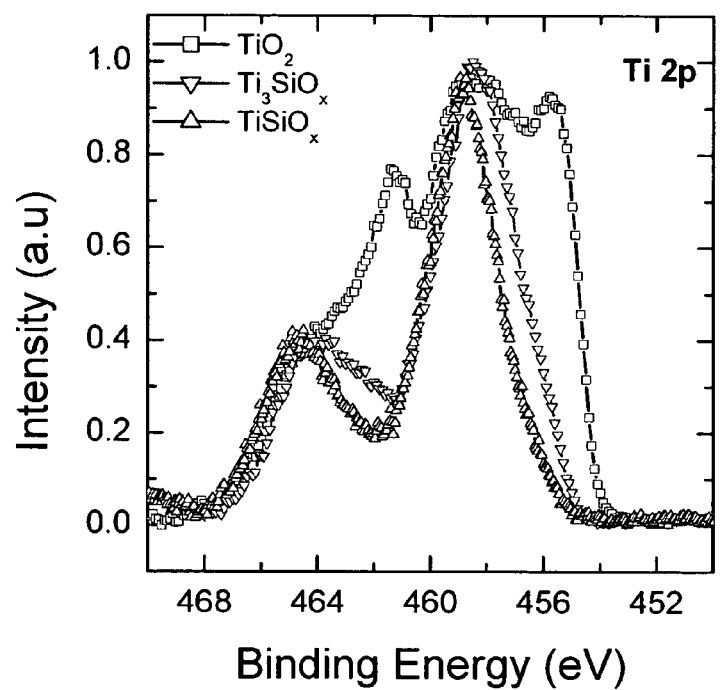
FIG. 10 shows the Ti 2p in depth of different compounds produced by sol-gel techniques.

FIG. 10 shows the Ti $2p_{3/2}$ peak of different compounds along with $TiO_2$ after Ar ion etching. The peak width of Ti $2p_{3/2}$ is found to reduce with the increase of $SiO_2$ in the films. The peak also shifts to a higher binding energy. This shifting of Ti 2p to higher binding energy confirms the formation of titanium silicate in the films.

Electrical Analysis

The relation of the dielectric constant with the capacitance of the film in a rectangular plate is given by:

$$C = K\frac{A}{d}$$

where C is the capacitance, K the dielectric constant, A the area and d is the thickness of the film.

Dielectric constant and dissipation factor as a function of annealing temperature The experimental parameters were:
TBOT:TEOS=1:1,
TBOT=22.4×10$^{-3}$ mole
TEOS=22.4×10$^{-3}$ mole
Water (0.1 M HCl)=22.2×10$^{-3}$ mole, (refluxing for 120 min at 70° C.)
R=$H_2O$/ TEOS=1
Dilution 1:3 (Volume), 1 layer films, 2 steps drying (70° C./30 min and 120° C./30 min), annealed 600° C./1 hrs.

Based on the above recipe, a sol was prepared and aged for ~70 hrs. A one layer film was deposited on platinum coated silicon substrates as well as on Si (100) substrates. The films were annealed in the oxygen atmosphere at 400° C., 500° C., 600° C. 700° C., 750° C. and 800° C. I–V and C–V measurements of the films are presented below.

The dielectric constant of the films annealed at different temperatures is presented in the table of FIG. 11. The average dielectric constant at 1 MHz is 23±1., which is nearly independent of the annealing temperature. However, the dielectric constant at low frequency (1 kHz) has a drastic variation from 130 to 25 as seen in the table of FIG. 11.

Figure 12:
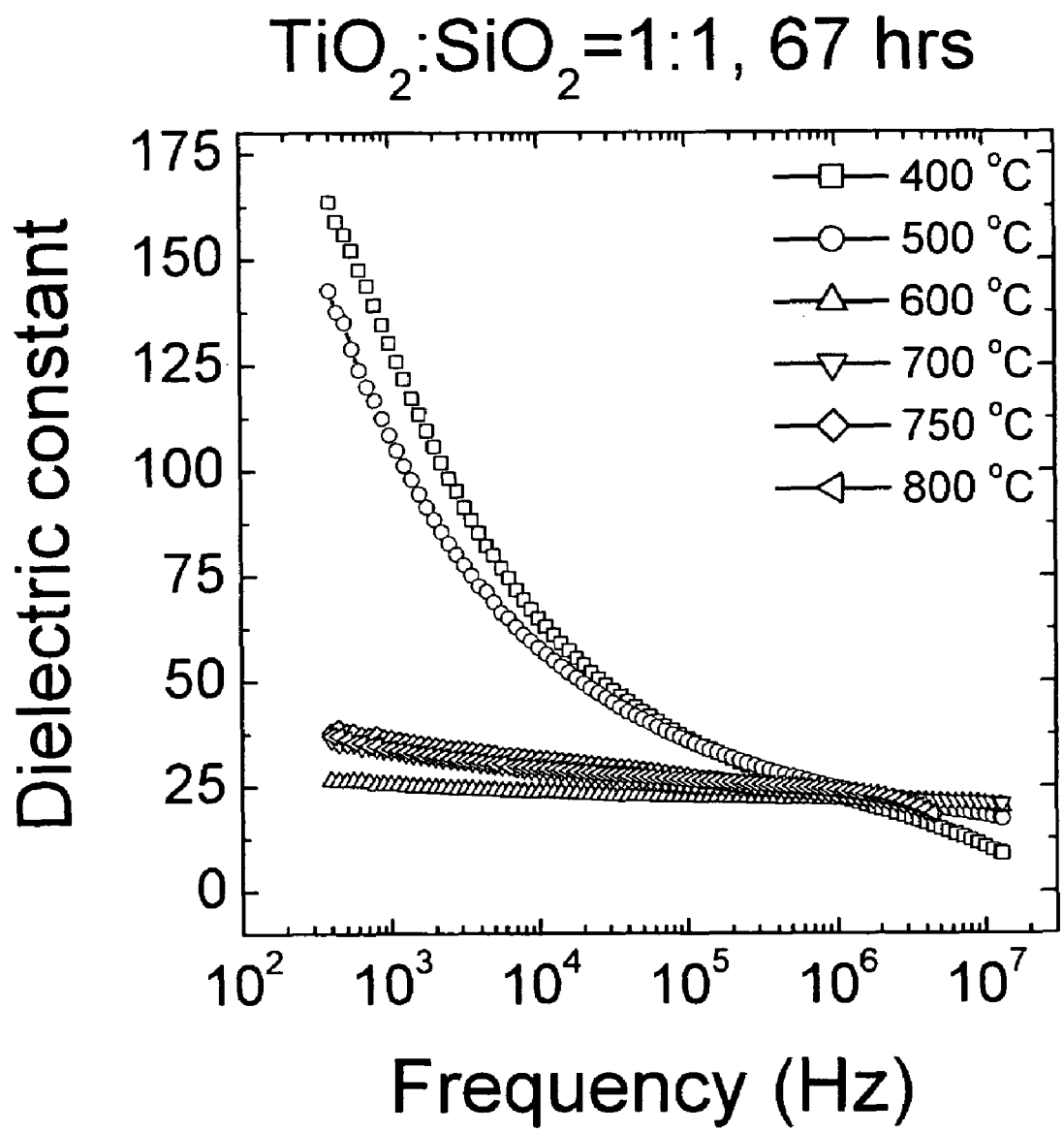
FIG. 12 shows the variation in dielectric constant with frequency at different annealing temperatures.
Figure 13:
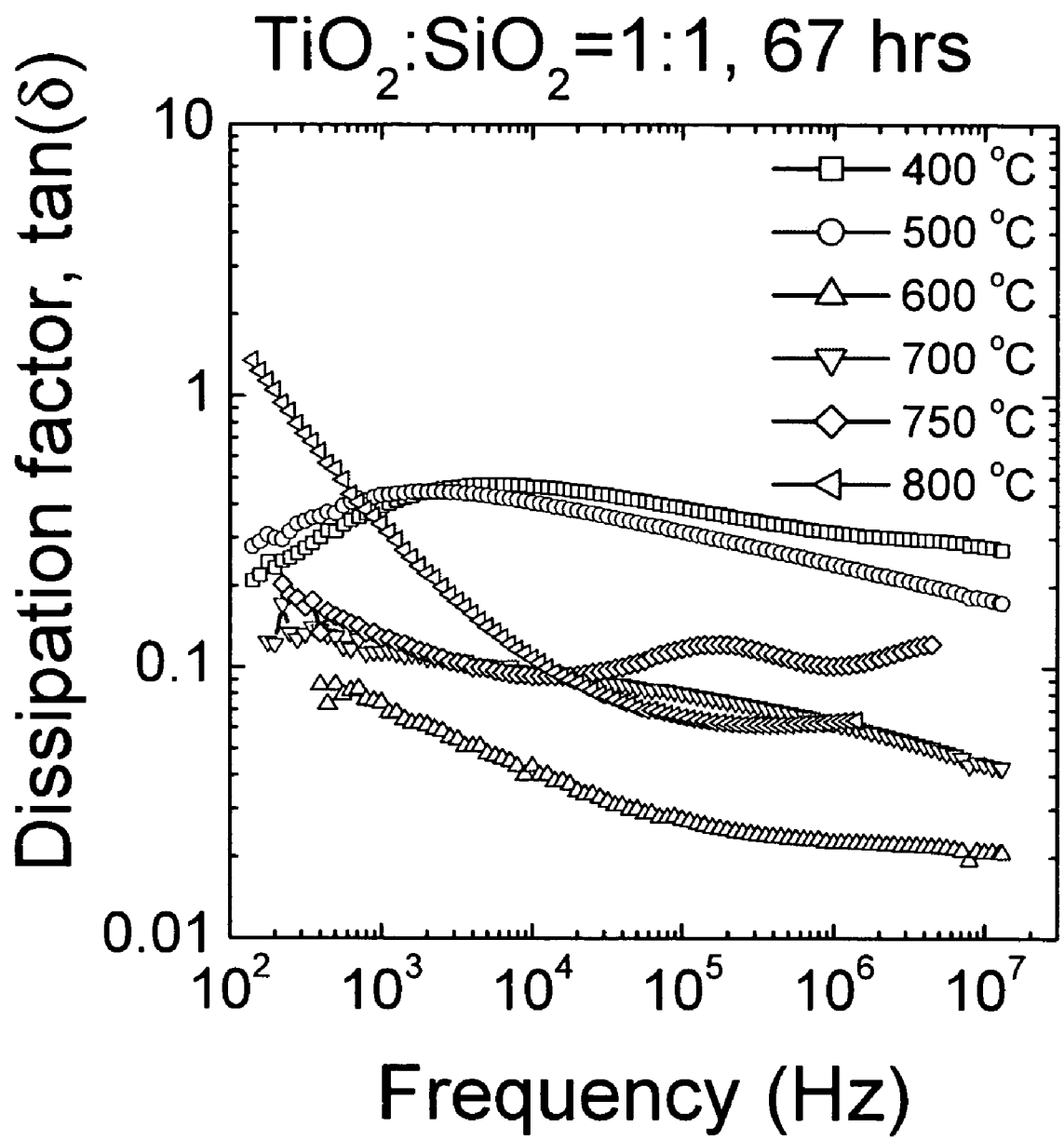
FIG. 13 shows the variation in dissipation factor with frequency at different annealing temperatures.
Figure 14:
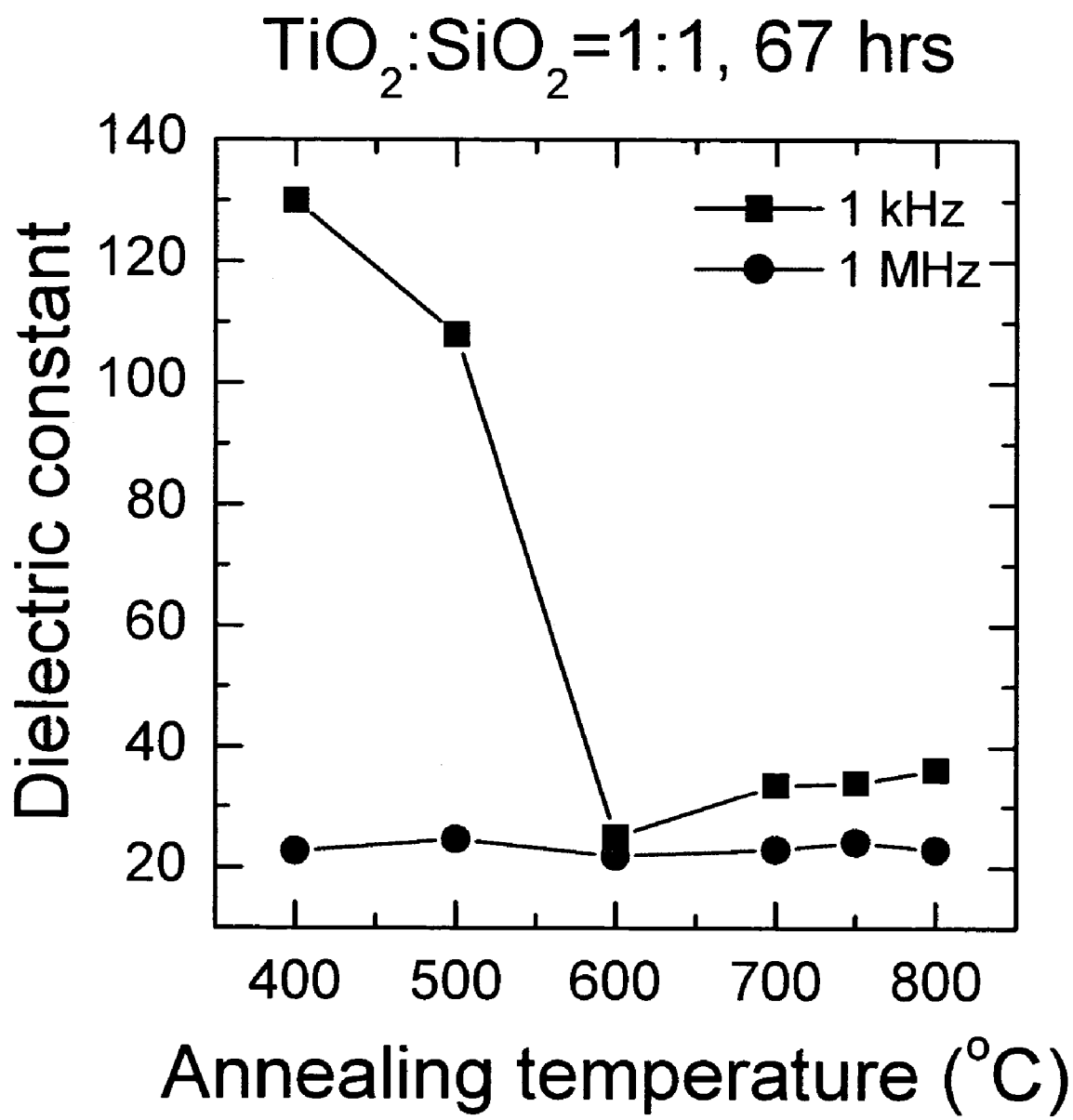
FIG. 14 shows variation in dielectric constant with frequency at different annealing temperatures.
Figure 15:
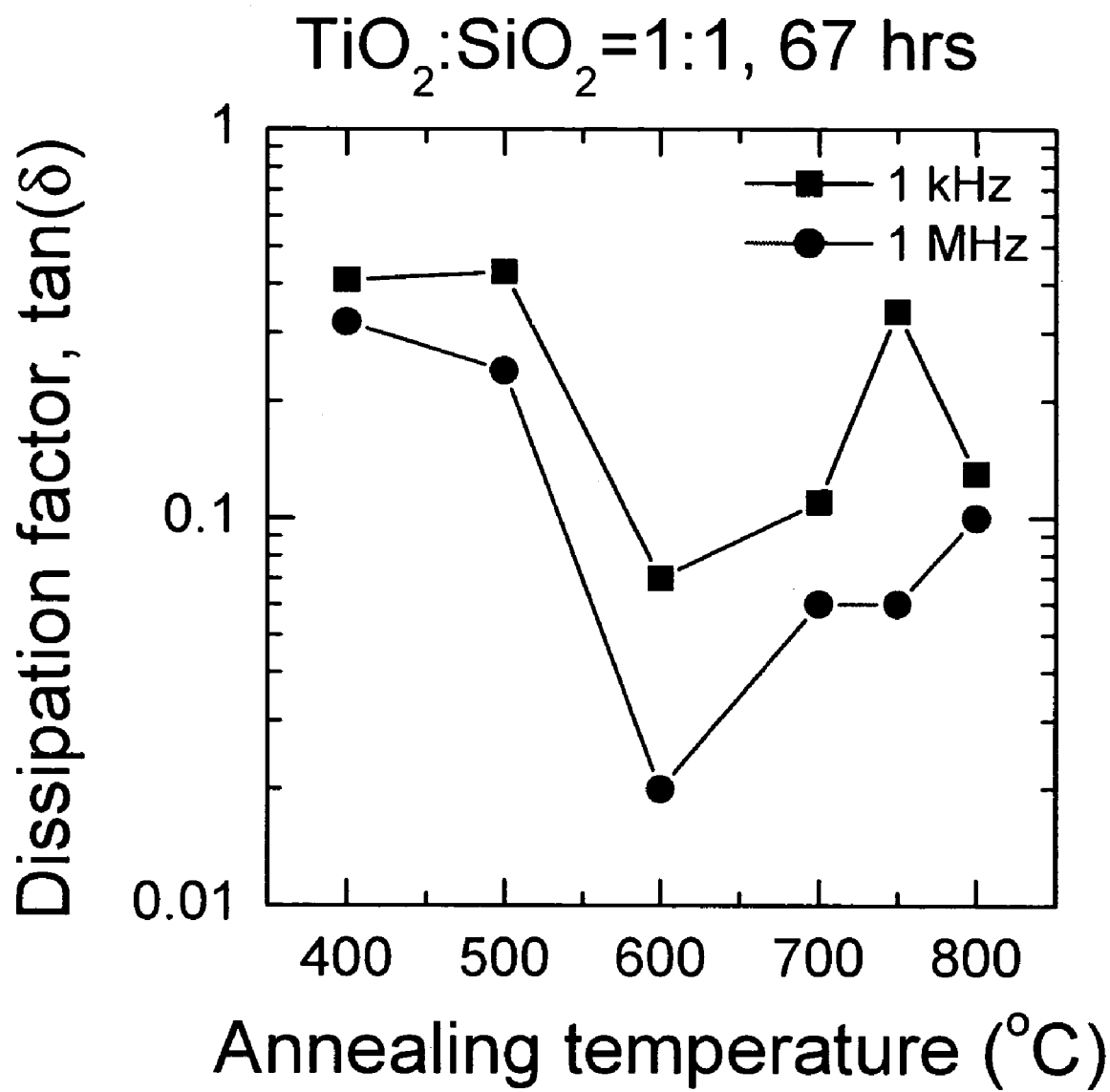
FIG. 15 shows variation in dissipation factor with frequency at different annealing temperatures.

The dielectric constant and the dissipation factor of the films annealed at different temperatures are presented in FIG. 12 and FIG. 13. The films annealed at 400° C. and 500° C. have a high relaxation as well as high dissipation factor at low frequencies. The relaxation as well as dissipation factor reduces after annealing the films at 600° C. The dielectric constant and dissipation factor increases slightly after increasing the annealing temperature to 700° C. FIG. 14 shows the change of dielectric constant at 1 kHz and 1 MHz with annealing temperatures. Similarly, FIG. 15 shows the change of dissipation factor at 1 kHz and 1 MHz with annealing temperatures. The dissipation factor reaches a minimum.

The dielectric constant of the films annealed at different temperatures is presented in table of FIG. 11. The average dielectric constant at 1 MHz is 23±1., which is nearly independent of the annealing temperature. However, the dielectric constant at low frequency (1 kHz) has a drastic variation from 130 to 25 as seen in table of FIG. 11.

The dielectric constant and the dissipation factor of the films annealed at different temperatures are presented in FIG. 12 and FIG. 13. The films annealed at 400° C. and 500° C. have a high relaxation as well as high dissipation factor at low frequencies. The relaxation as well as dissipation factor reduces after annealing the films at 600° C. The dielectric constant and dissipation factor increases slightly after increasing the annealing temperature to 700° C. FIG. 14 shows the change of dielectric constant at 1 kHz and 1 MHz with annealing temperatures. Similarly, FIG. 15 shows the change of dissipation factor at 1 kHz and 1 MHz with annealing temperatures. The dissipation factor reaches a minimum value of 0.02 at 1 MHz for the samples annealed at 600° C. Dissipation factor starts increasing with the annealing temperatures and reaches 0.1 at 800° C. annealed samples, probably because of some Pt electrodes evolution.

Leakage Current on Annealing Temperatures

Figure 16:
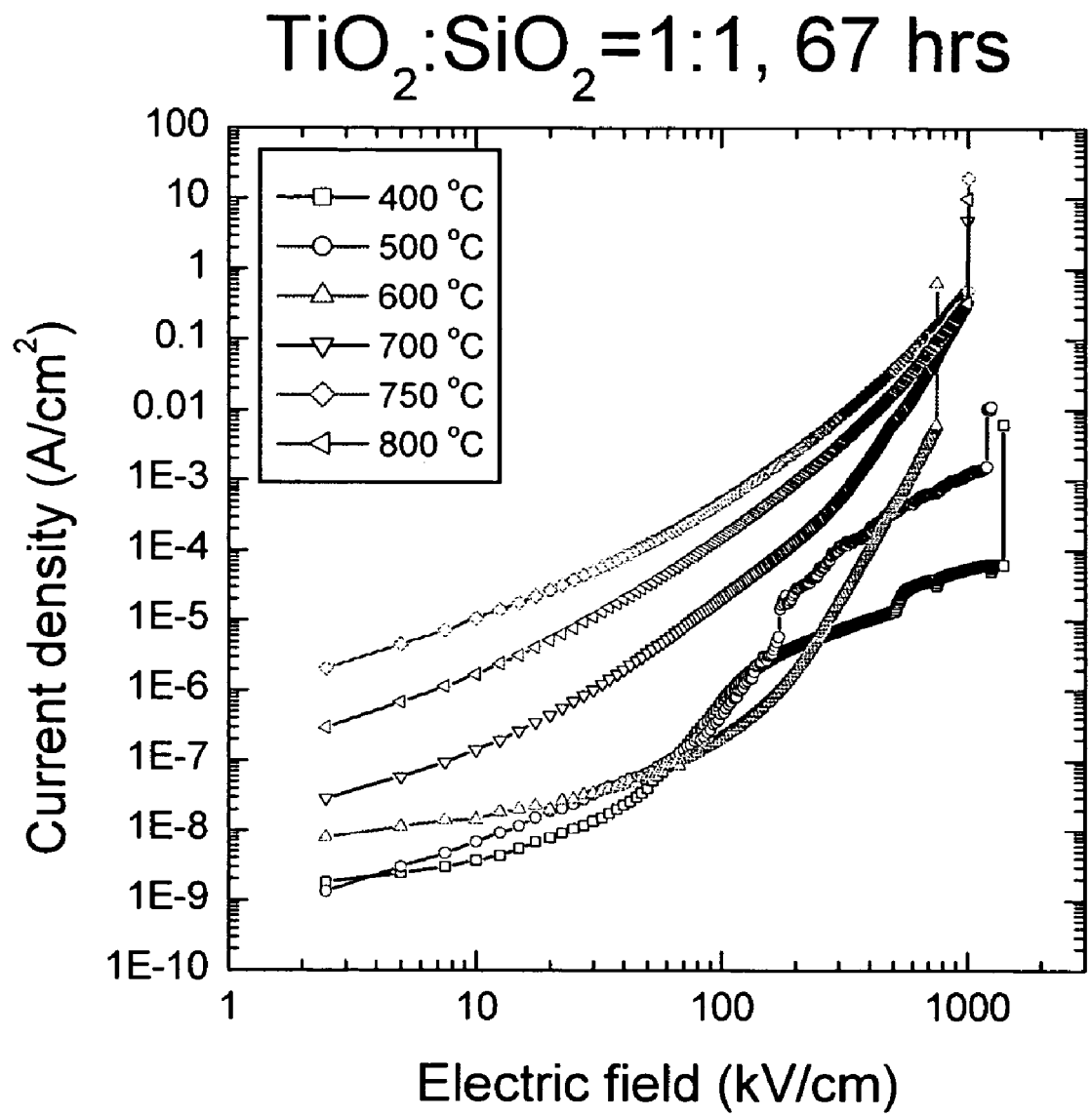
FIG. 16 shows the leakage current with electric field at different annealing temperatures.
Figure 17:
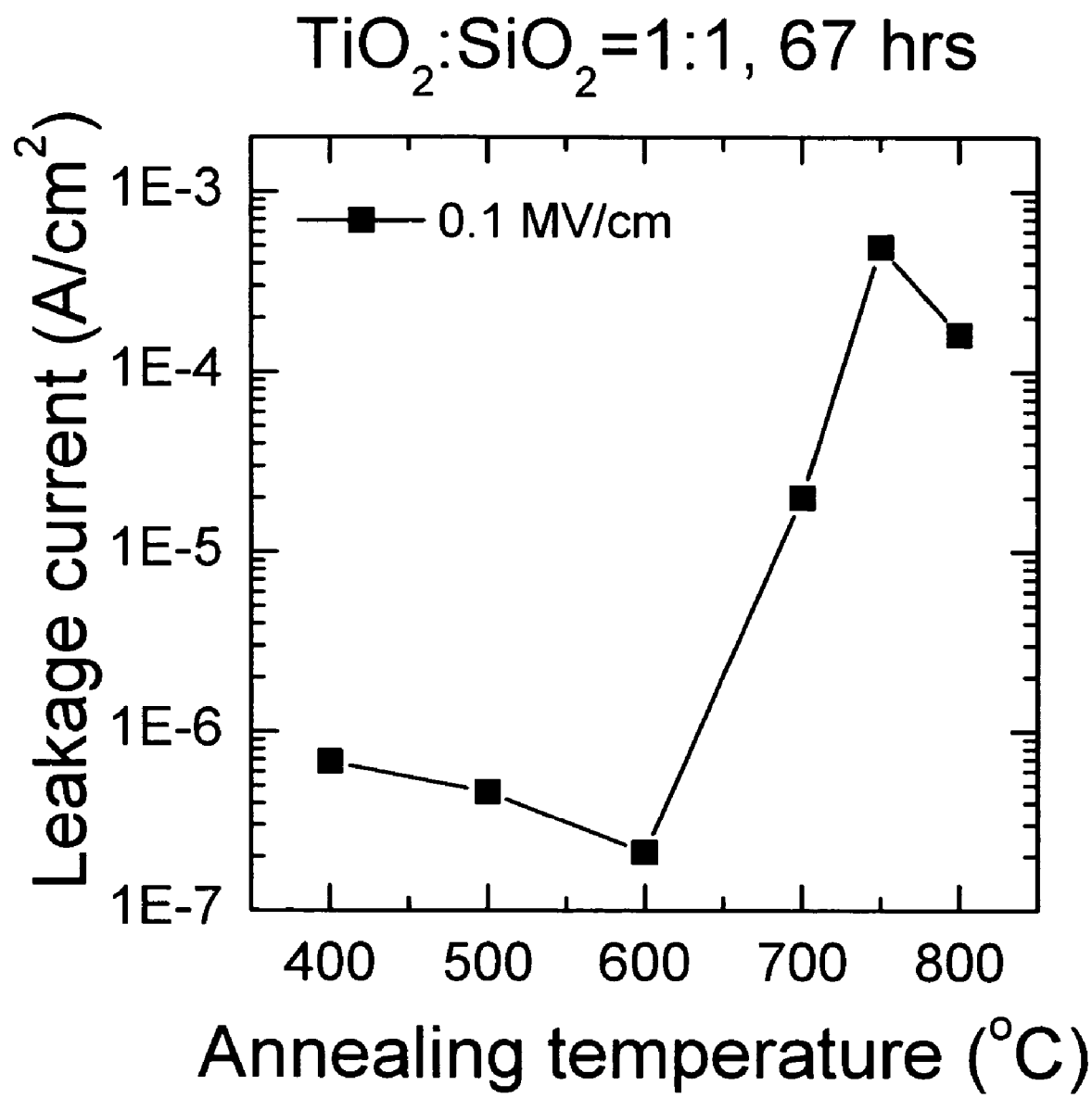
FIG. 17 shows the leakage current with annealing temperature at the electric field of 0.1 MV/cm.

FIG. 16 shows the I–V characteristic of the $TiSiO_x$ films annealed at 400° C., 500° C., 600° C., 700° C., 750° C. and 800° C. FIG. 17 presents the leakage current density at the electric field of 0.1 MV/cm with annealing temperatures. Leakage current reduces with annealing temperature and attains minimum at 600° C. with the value of 2E–7 A/cm². Leakage current increases to 8E–4 A/cm² when the annealing temperature is increased to 750° C. For useful results, the annealing temperature should lie in the range of about 500 to 700° C.

Role of aging time on dielectric constant and leakage current for TiO2:SiO2=1:1

The experimental parameters were:
TBOT:TEOS=1:1,
TBOT=22.4×10$^{-3}$ mole
TEOS=22.4×10$^{-3}$ mole
Water (0.1 M HCl)=22.2×10$^{-3}$ mole, (refluxing for 120 min at 70° C.)
R=$H_2O$/ TEOS=1
Dilution 1:3 (Volume), 1 layer films, 2 steps drying (70° C./30 min and 120° C./30 min), annealed 600° C./1 hrs.

Figure 18:
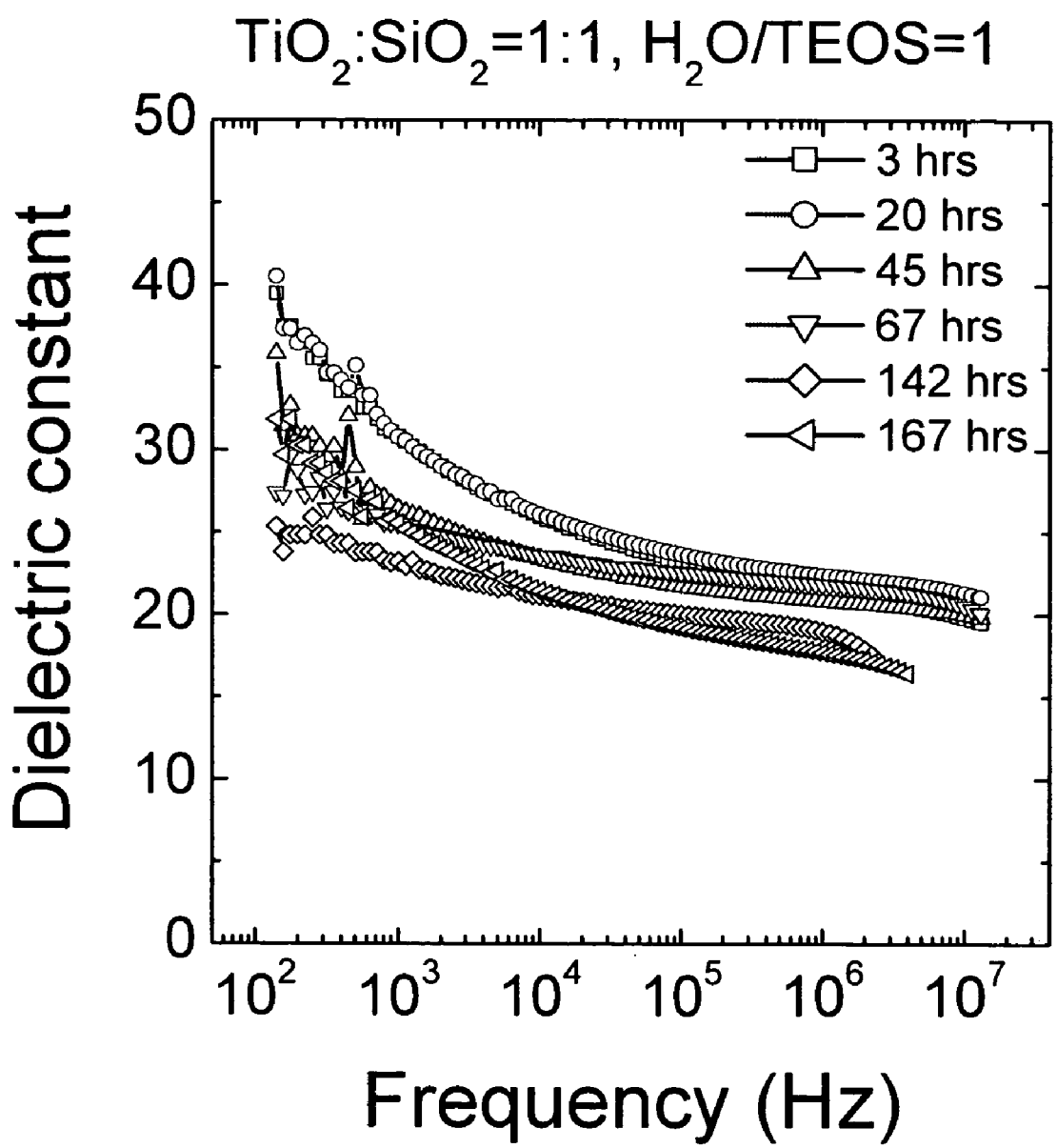
FIG. 18 shows the dielectric constant with aging time for the films prepared using TBOT:TEOS=1:1.
Figure 19:
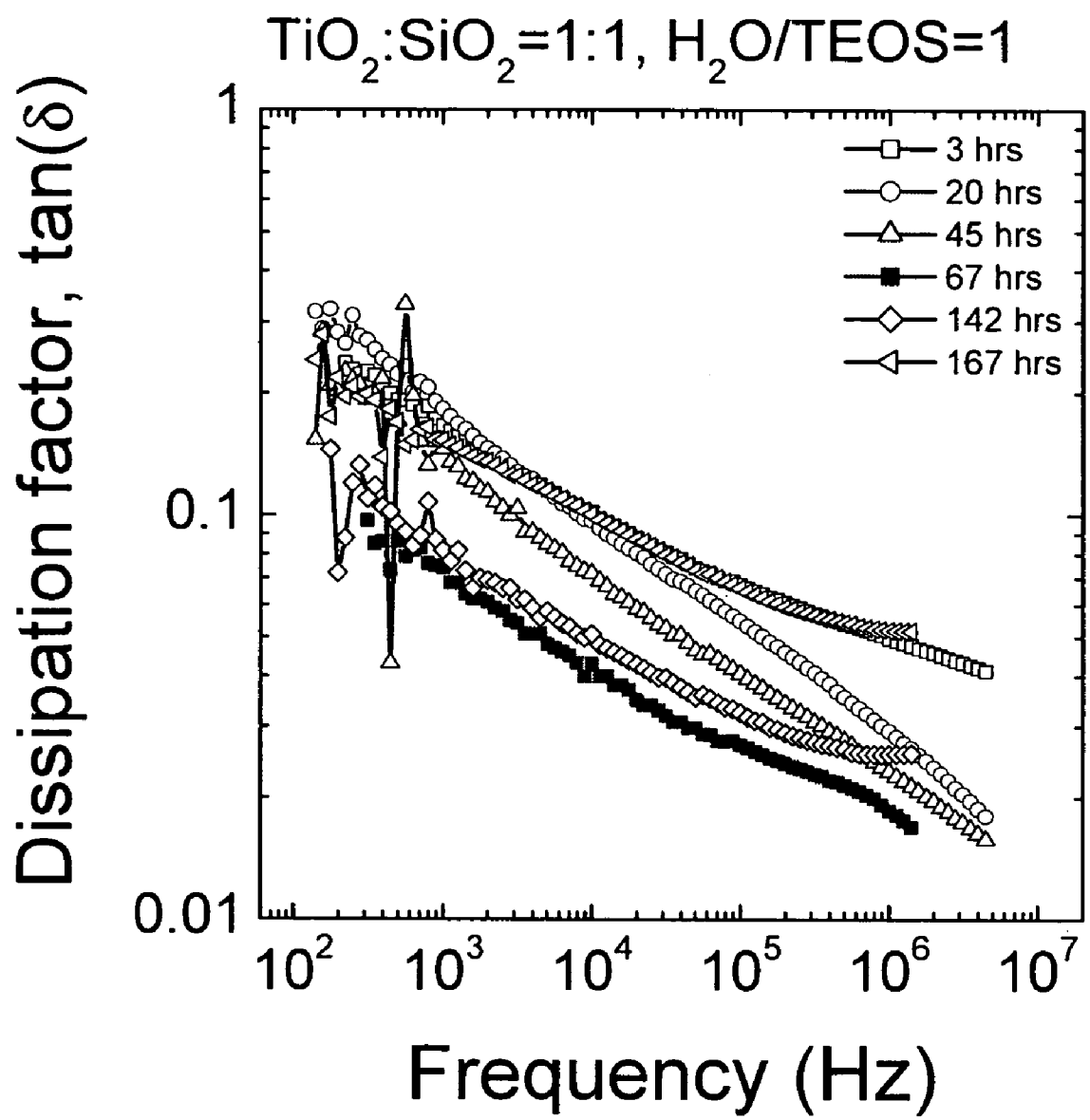
FIG. 19 shows the dissipation factor with aging time for the films prepared using TBOT:TEOS=1:1.
Figure 20:
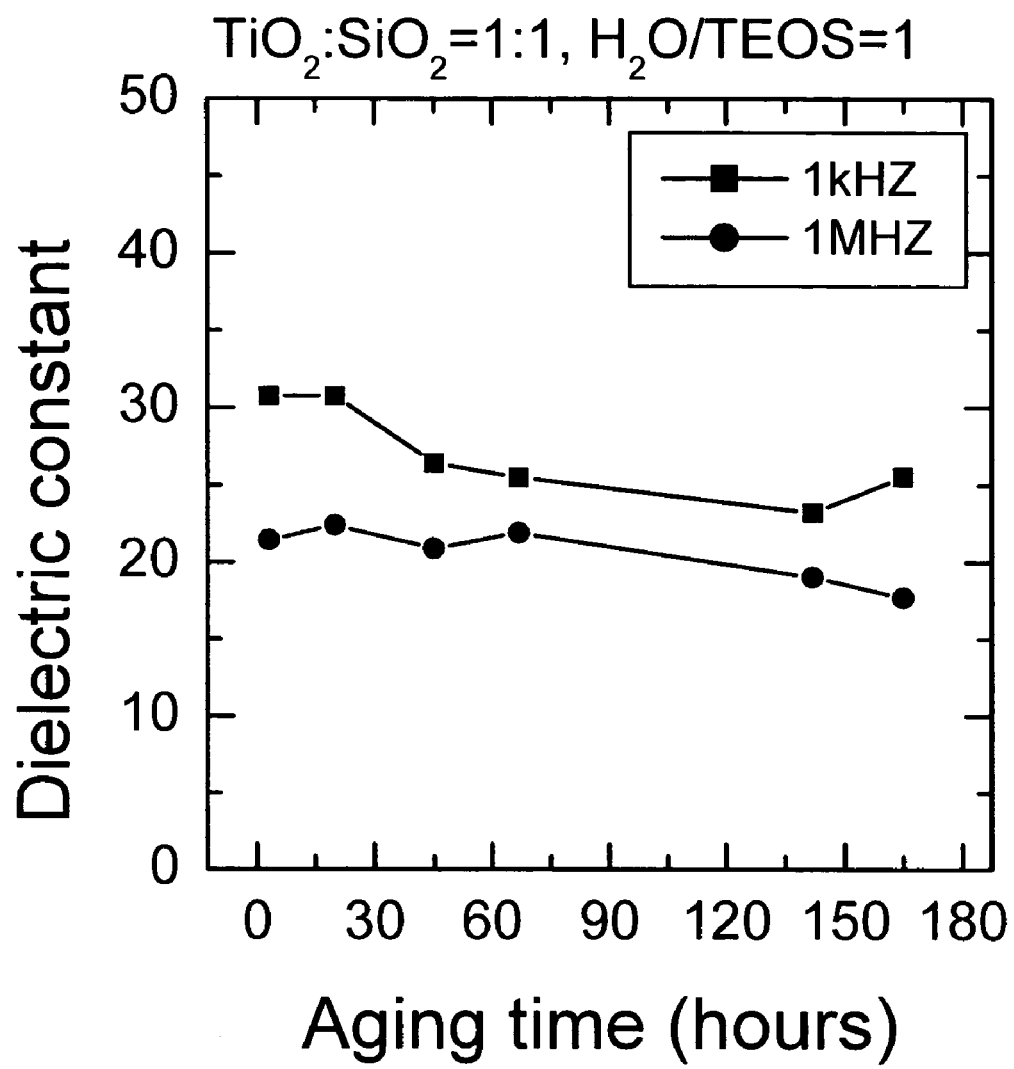
FIG. 20 shows the dielectric constant with aging time for 1 MHz and 1 kHz.

FIG. 18 and FIG. 19 show the variation of dielectric constant and dissipation factor as a function of frequency for various aging times. It is seen that the relaxation at lower frequencies reduces with the aging time. FIG. 20 summarizes the variation of dielectric constant at 1 kHz and 1 MHz with different aging time. The average dielectric constant in different aging time is 20.5 (±1.5) at 1 MHz. On the other hand the dielectric constant at 1 kHz is 27.0 (±3).

Figure 21:
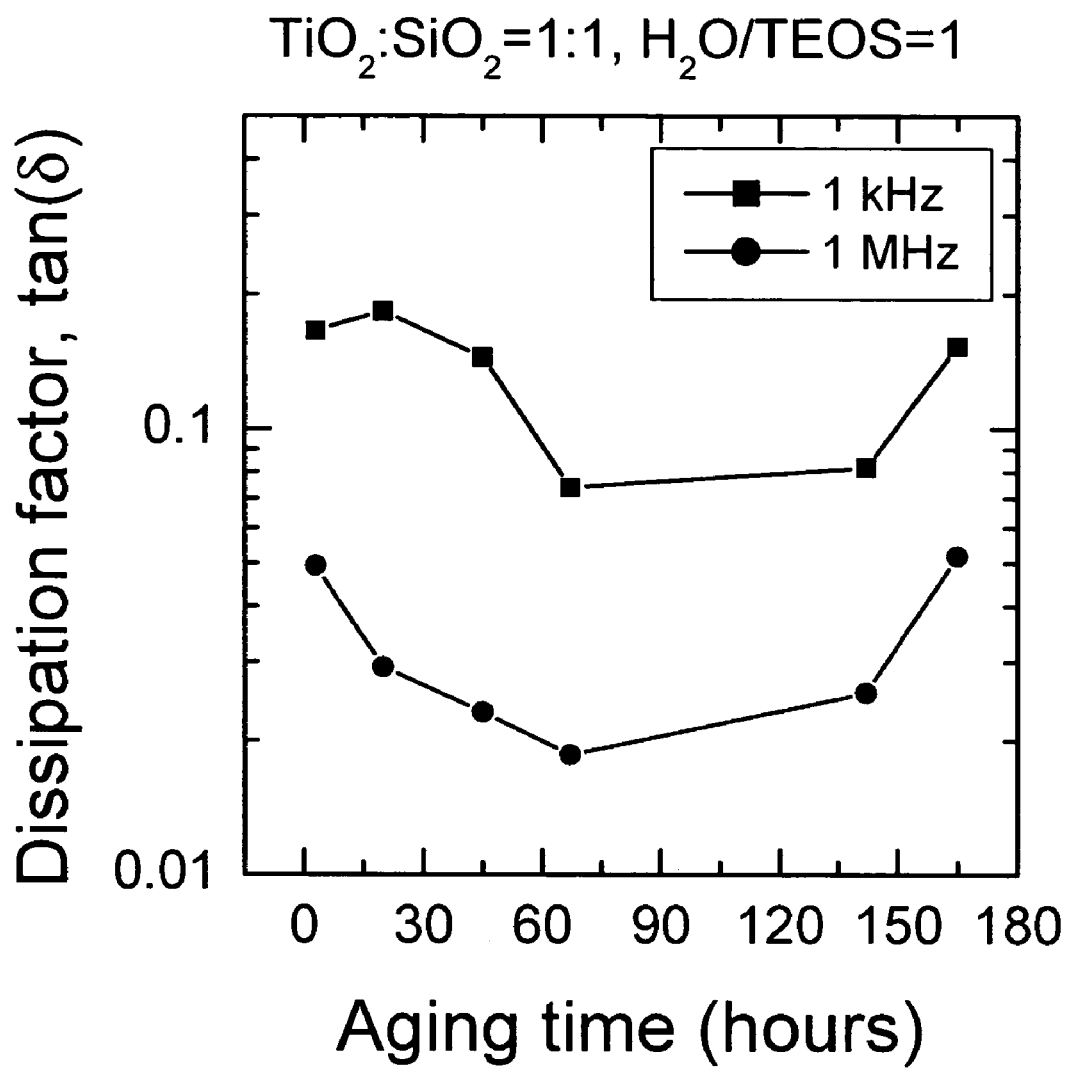
FIG. 21 shows the dissipation factor with aging time for 1 MHz and 1 kHz.

Though the dielectric constant remains constant with aging time at 1 MHz, the dissipation factor reduces with aging time and becomes minimum at 70–100 hrs (experiment performed at 67 hrs) of aging time as shown in FIG. 21. The dissipation factor then starts increasing again with the aging time. The minimum of dissipation is observed to be 0.018 at the aging time of around ~67 hrs. The variation of dissipation factor at 1 KHz with the aging time has also been presented in FIG. 21.

Figure 22:
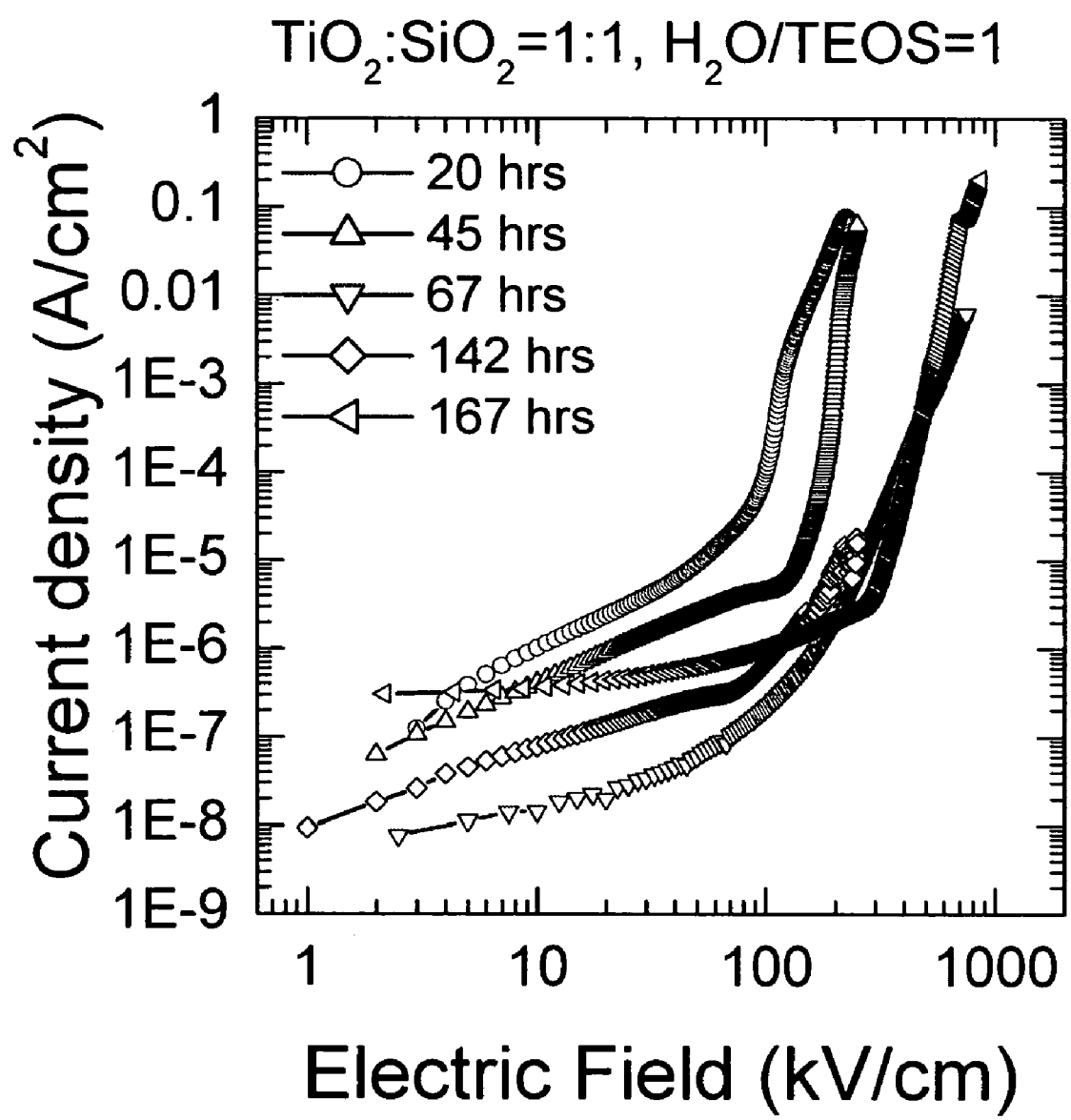
FIG. 22 shows the J-E characteristics of TiSiO film with different aging time.
Figure 23:
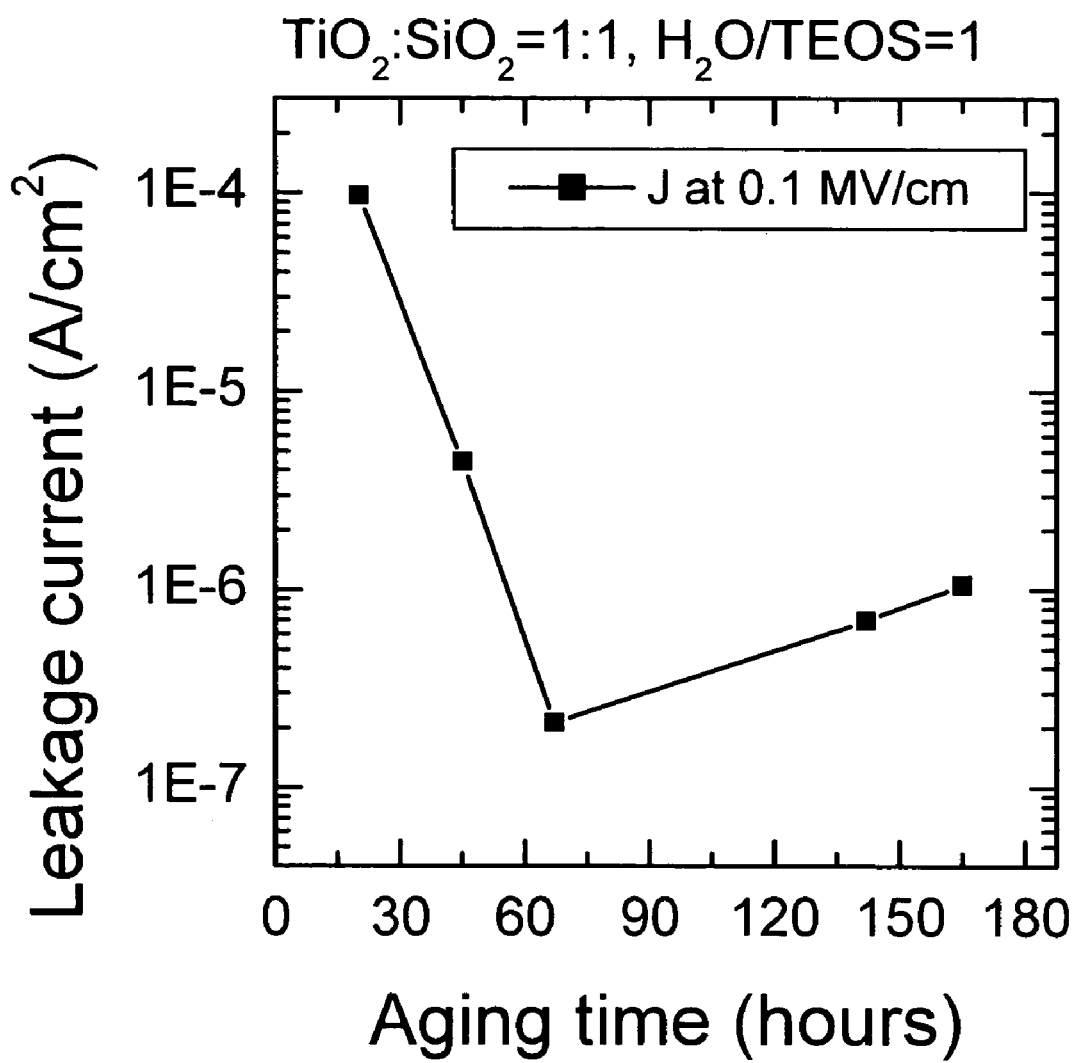
FIG. 23 shows the Leakage current density at 0.1 MV/cm electric field with different aging time.

Likewise, even if the dielectric constants remain nearly constant with aging time, the leakage current density at electric field of 0.1 MV/cm reduces with aging time. FIG. 22 shows the variation of current density with the applied electric field for the films produced from the sol, which have been aged from 20 hrs to 167 hrs. FIG. 23 summarizes the variation of leakage current with the aging time for an applied electric field of 0.1 MV/cm. While the leakage current is of ~1E-4 A/cm$^2$, at 20 hrs of aging time, it becomes minimum (~2.0E-7 A/cm$^2$) at aging time of 67 hrs and then increases again to 6.9E-7 A/cm$^2$ as the aging time is increased to 142 hrs. As the aging time is further increased to 167 hrs, the leakage current slightly increases to 1.0E-6 A/cm$^2$. This variation of leakage current with aging time is very consistent with that of the dissipation factor.

Role of Aging Time on Dielectric Constant and Leakage Current for Titania-rich TiO2:SiO2=3:1 Films The experimental parameters were:
TBOT:TEOS=3:1 (molar)
TBOT=26.8×10$^{-3}$ mole
TEOS=8.96×10$^{-3}$ mole
C$_2$H$_5$OH=393×10$^{-3}$ mole
Water=20.2×10$^{-3}$ mole
R=H$_2$O/TEOS=2.2
Refluxing for 30 minutes at 70° C.
Dilution 1:3 (Volume)
1 layer films
2 steps drying (70° C./30 min and 120° C./30 min)
Annealed 600° C./1 hrs Different aging times were investigated, as illustrated by the following figures.

Figure 24:
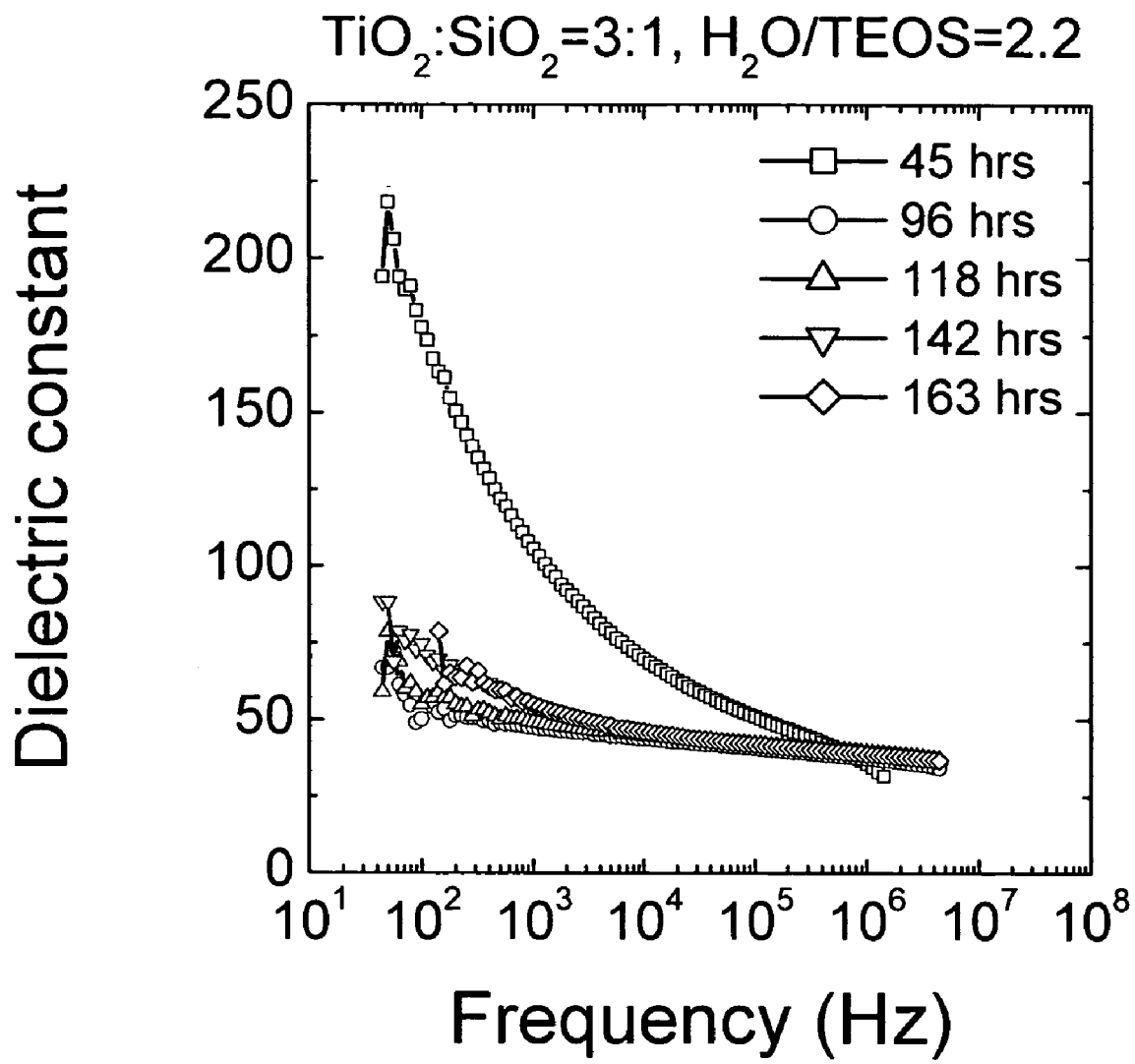
FIG. 24 shows the variation in dielectric constant with frequency; for TiSiO film with TiO2:SiO2=3:1.
Figure 25:
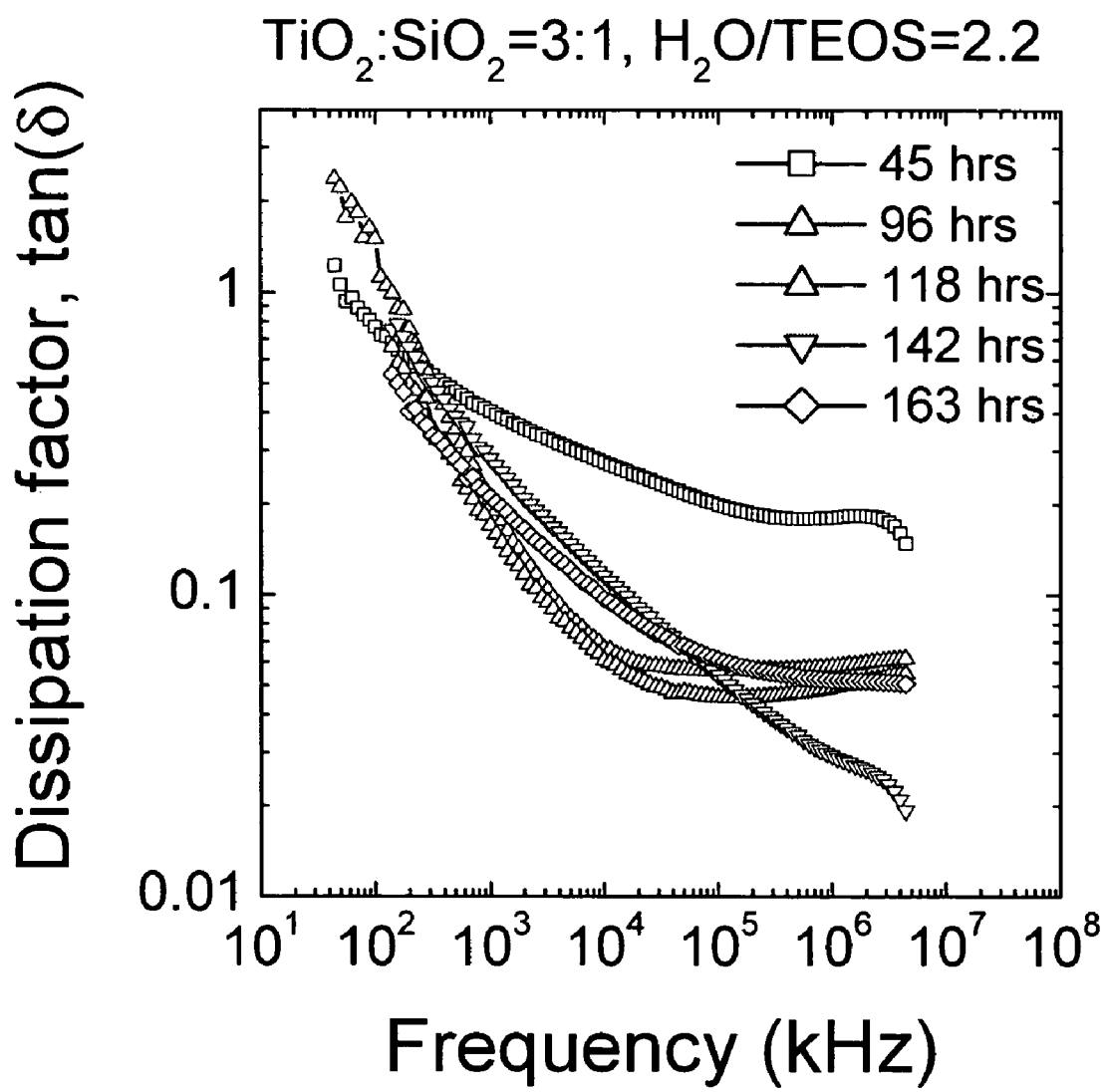
FIG. 25 shows the dissipation factor with frequency for TiSiO film with TiO2:SiO2=3:1.

FIG. 24 and FIG. 25 show the variation of dielectric constant and the dissipation factor as a function of frequency for various aging times.

Figure 26:
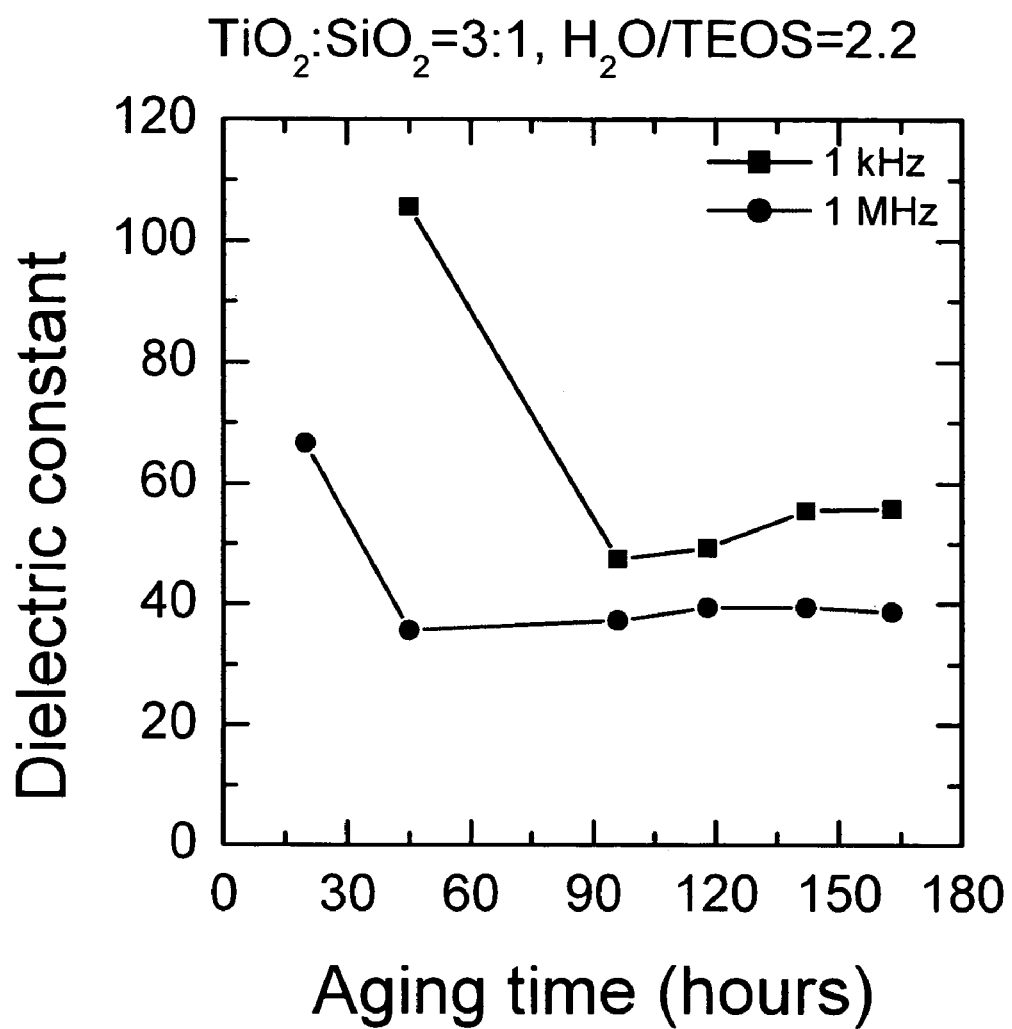
FIG. 26 shows the dielectric constant with aging time at 1 kHz and 1 MHz for TiSiO film with TiO2:SiO2=3:1.

FIG. 26 shows the variation of dielectric constant at 1 kHz and 1 MHz with different aging time. The average dielectric constant at 1 MHz with five aging times (45, 96, 118, 142 and 163 hrs) is 38 (±1.5) as shown in FIG. 26. Such a high value of the dielectric constant for the titanium silicate has not been reported in the literature. In the following publication: Nishiyama, A. Kaneko, M. Koyama, Y. Kamata, I. Fujiwara, M. Koike, M. Yoshiki and M. Koike, Mat. Res. Soc. Symp. Proc. 670, K4.8.1 (2001, the authors have reported that rf-sputtered TiO$_2$ has a dielectric constant of about 39 and titanium silicate with composition (TiO$_2$)$_{0.57}$ (SiO$_2$)$_{0.43}$ has a dielectric constant about 29. The present inventors have found that the dielectric constant at 20 hrs aging time was around 66 and was not used for the averaging of the dielectric constant at 1 MHz. The dielectric constant at low frequency (1 kHz) was also found to reduce with aging time. The average dielectric constant of four samples (aged 96, 118, 142 and 163 hrs) at 1 kHz was about 51 (±4).

Figure 27:
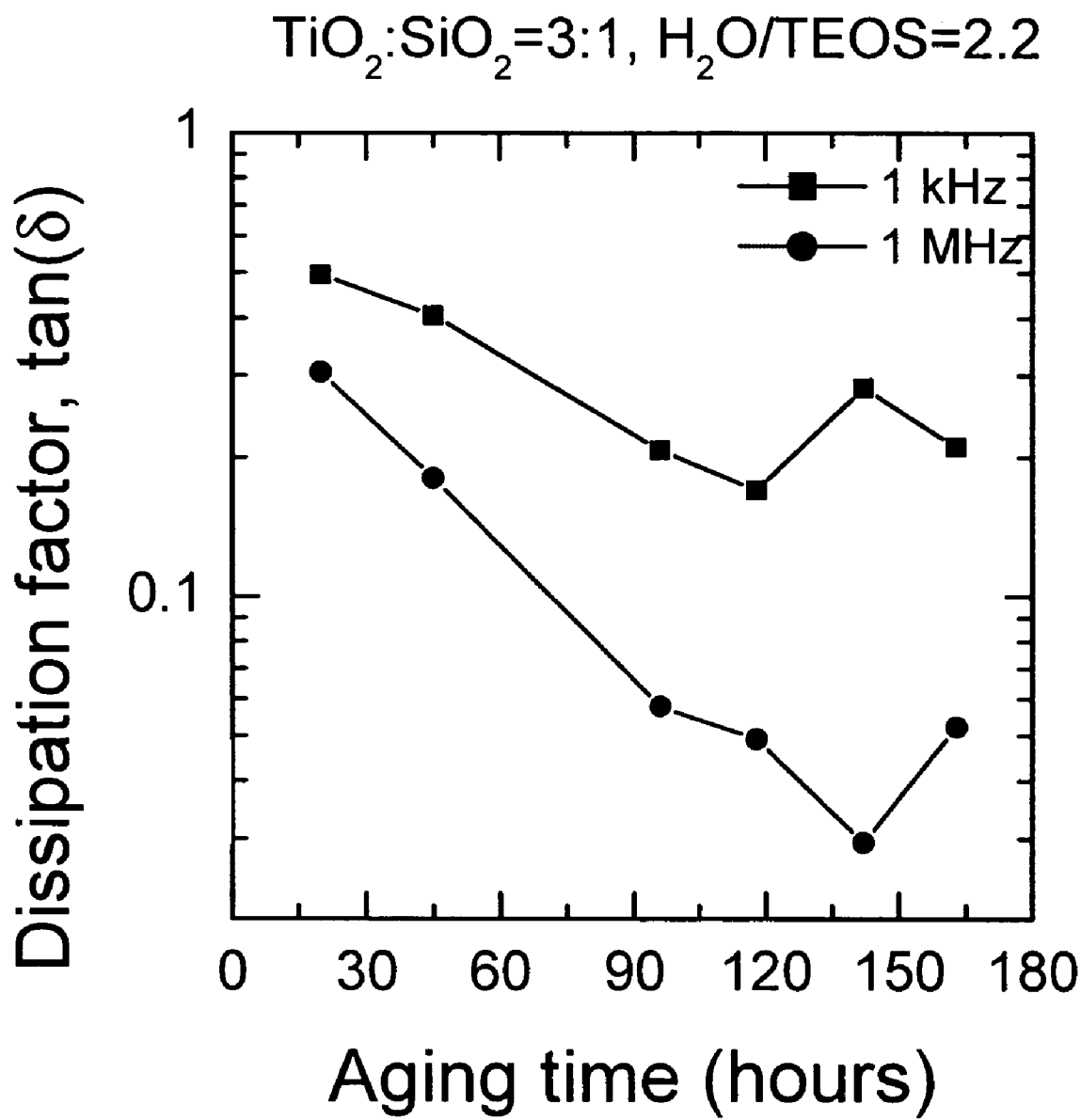
FIG. 27 shows the dissipation factor with aging time at and 1 MHz for TiSiO film with TiO2:SiO2=3:1.

The dissipation factor was also found to reduce with aging time as shown in the FIG. 27. For 20 hrs aged-sol films, the dissipation factor is of ~0.3 while it decreases to a very low value of ~0.03 for the films made from sol aged 142 hrs. The dissipation factor of the films made from the sol aged for 163 increased to 0.05.

Figure 28:
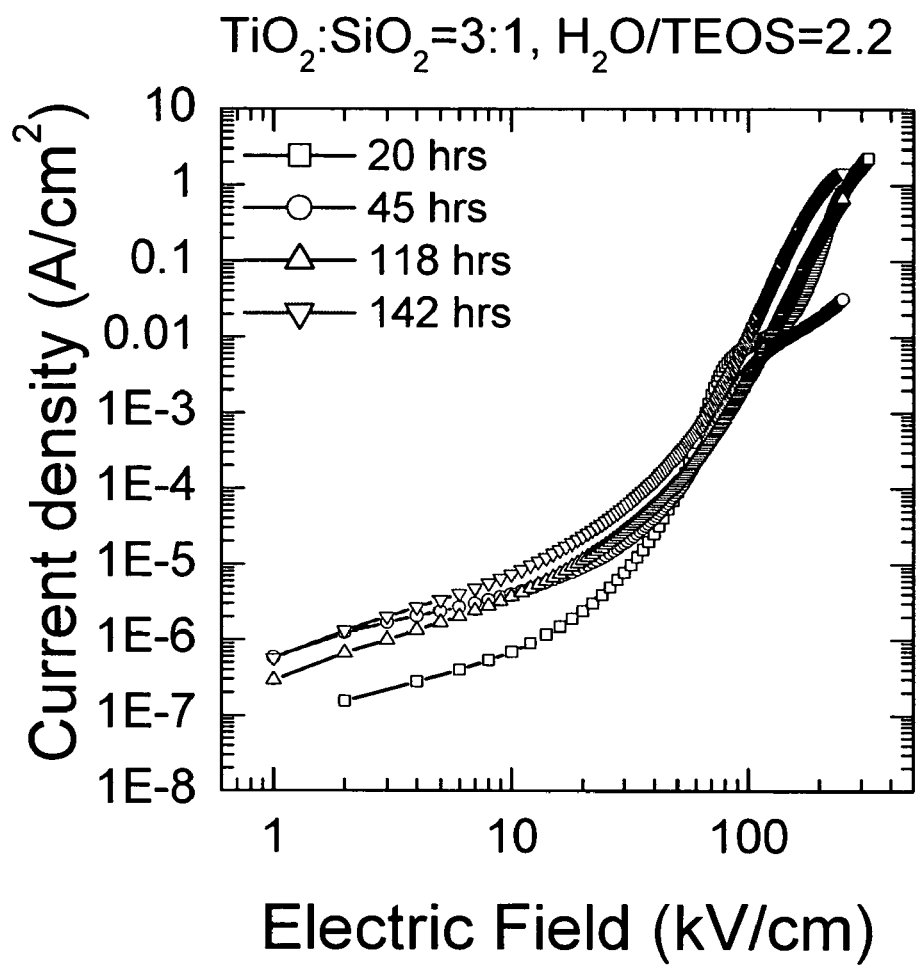
FIG. 28 shows the J-E characteristics of Ti$_3$SiOx film with different aging time for TiSiO film with TiO2:SiO2=3:1.

FIG. 28 shows the variation of leakage current density with the electric field in different samples which have been made from various aged sols. The J-E curve is very similar and nearly independent of aging time.

Figure 29:
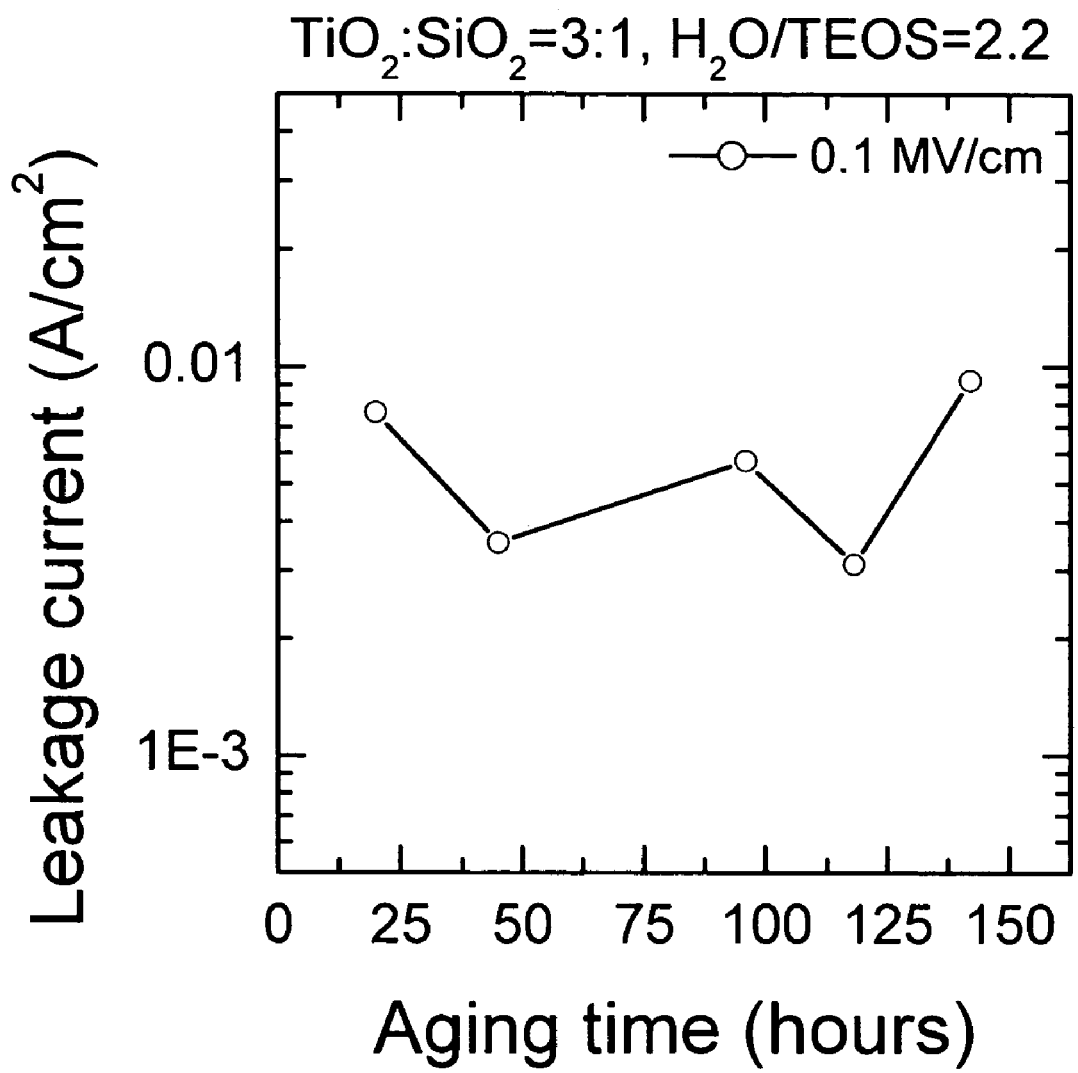
FIG. 29 shows the leakage current density at 100 kV/cm electric field with different aging time with TiO$_2$:SiO$_2$=3:1.

FIG. 29 shows the average leakage current for the five samples (20, 45, 96, 118 and 142 hrs) is of about 5.8E-3 A/cm$^2$.

At this point it should be noted that the average dielectric constant is increased from 20 to 40 for TiO$_2$:SiO$_2$=1:1 to 3:1; at the same time leakage current is also increased from ~5E-7 to ~5E-3 A/cm$^2$ at 0.1 MV/cm.

Role of Aging Time on Dielectric Constant and Leakage Current for TiO2:SiO2=1:3 (i.e., SiO$_2$-rich Titanium Silicate Films)

Figure 30:
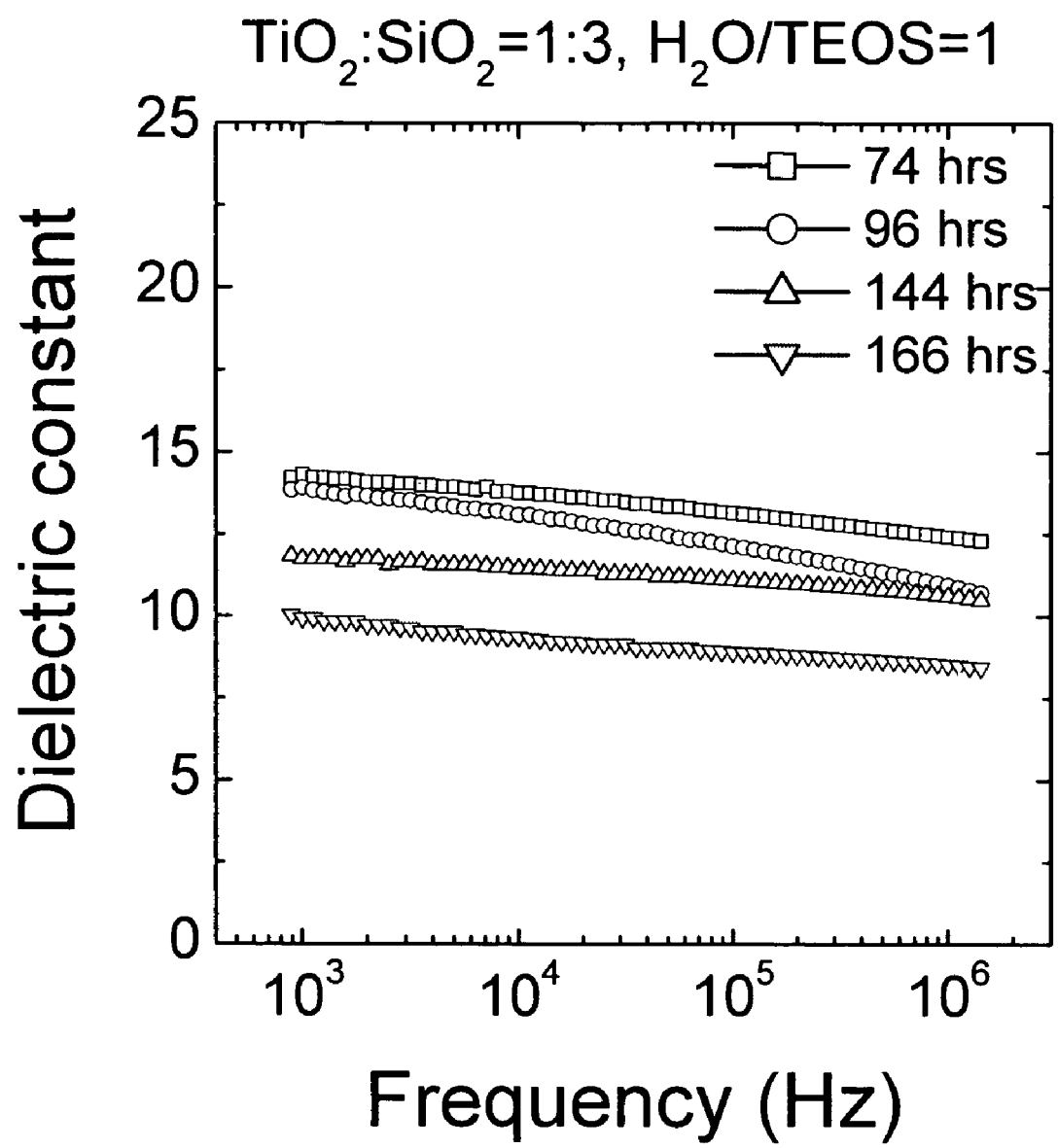
FIG. 30 shows the variation in dielectric constant with frequency for TiSiO film with TiO2:SiO2=1:3.
Figure 31:
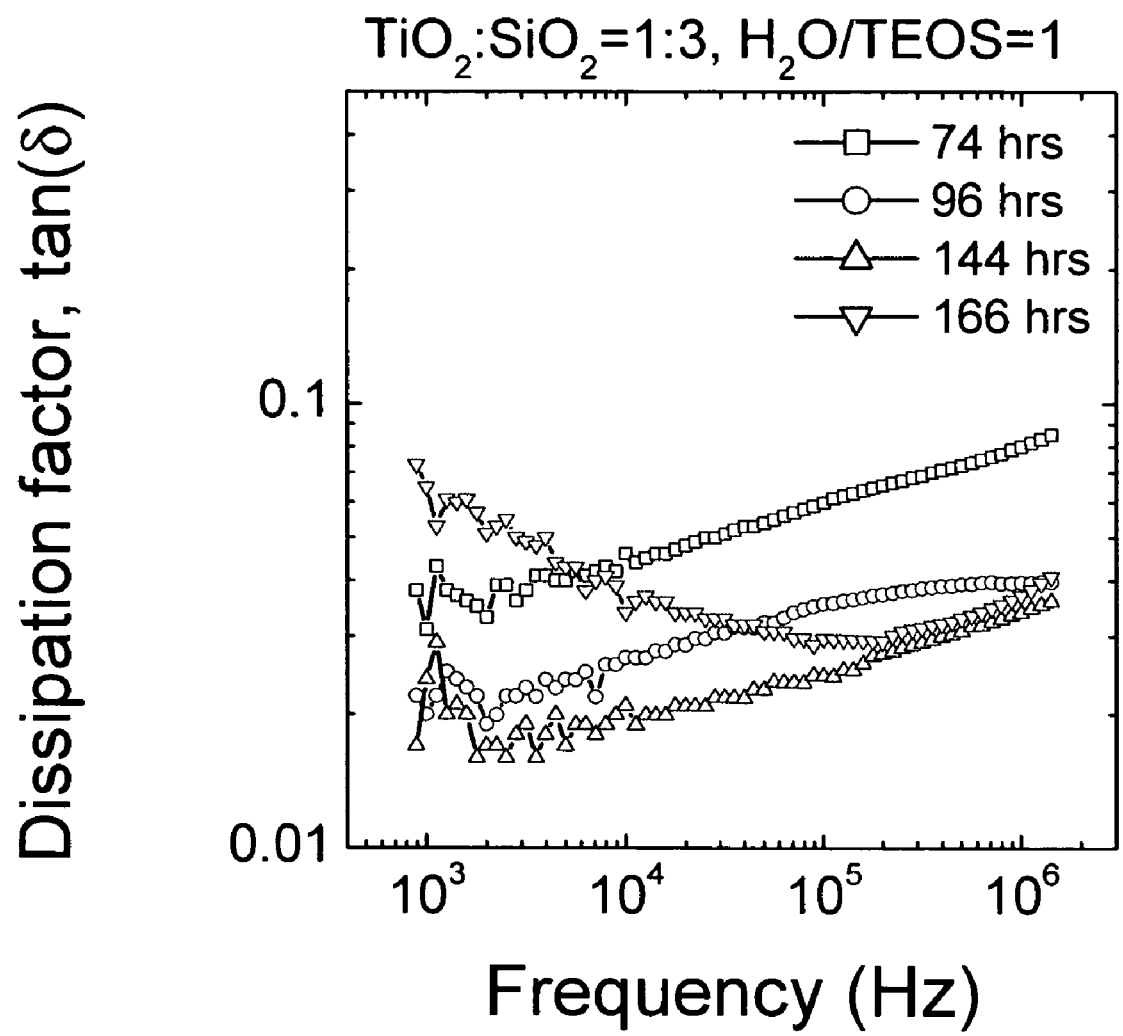
FIG. 31 shows the variation in dissipation factor with frequency for TiSiO film with TiO2:SiO2=1:3.

The experimental parameters were:
TBOT:TEOS=1:3 (molar)
TBOT=11.94×10$^{-3}$ mole
TEOS=35.84×10$^{-3}$ mole
C$_2$H$_5$OH=452×10$^{-3}$ mole
Water (0.1 M HCl)=37.8×10$^{-3}$ mole
R=H$_2$O/TEOS=1
Refluxing for 120 minutes at 70° C.
Dilution 1:3 (Volume)
1 layer films
2 steps drying (70° C./30 min and 120° C./30 min)
Annealed 600° C./1 hrs FIG. 30 and FIG. 31 show the variation of dielectric constant and the dissipation factor with frequencies for different films produced from sol with various aging times. One can notice that these silica-rich films did not show any relaxation at low frequencies as compared to the samples produced with TiO$_2$:SiO$_2$=1:1 and 3:1. In this case dissipation factor was found to increase slightly with the increase of frequencies, which is unusual.

Figure 32:
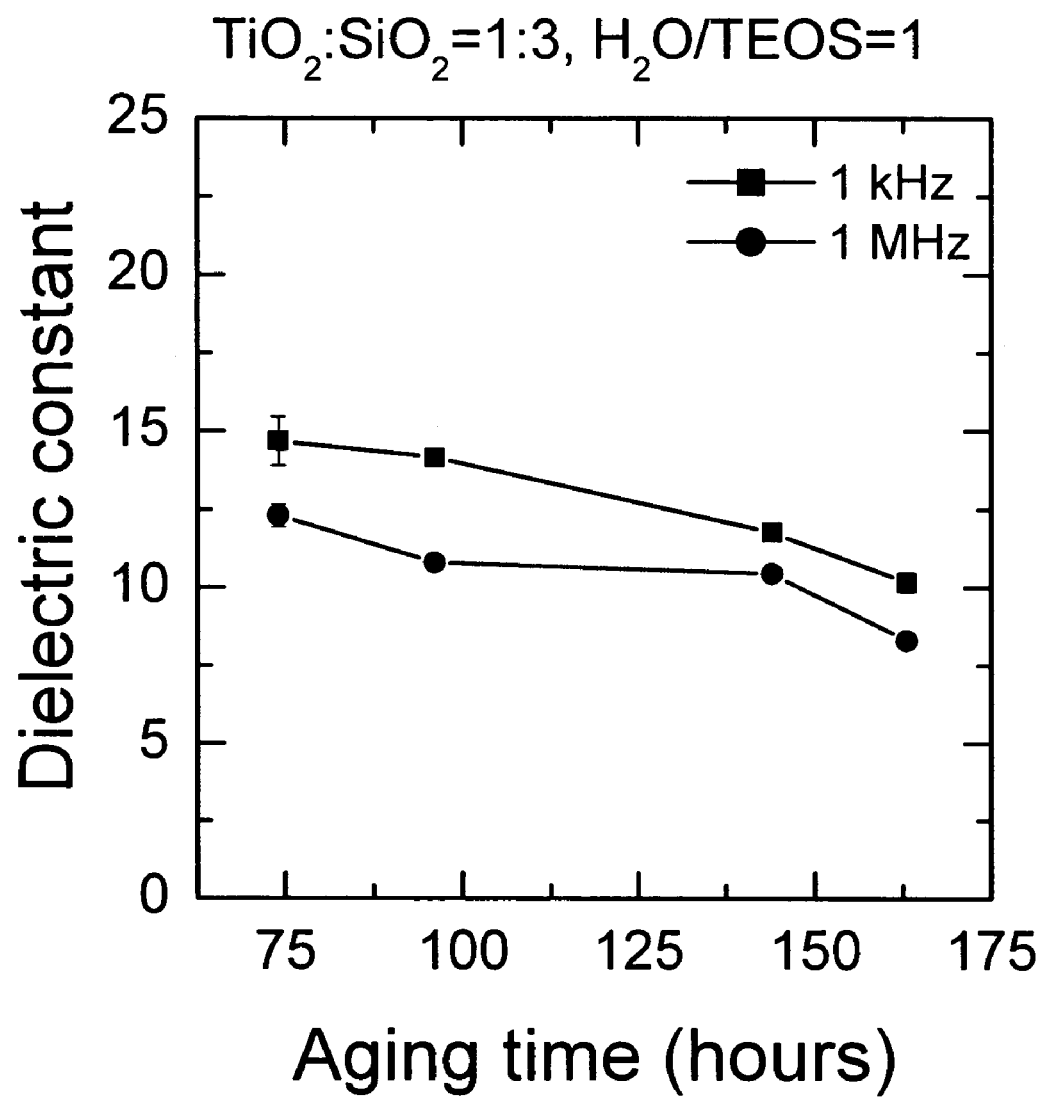
FIG. 32 shows the variation in dielectric constant with aging time at 1 kHz and 1 MHz for TiSiOx film with TiO2:SiO2=1:3.
Figure 33:
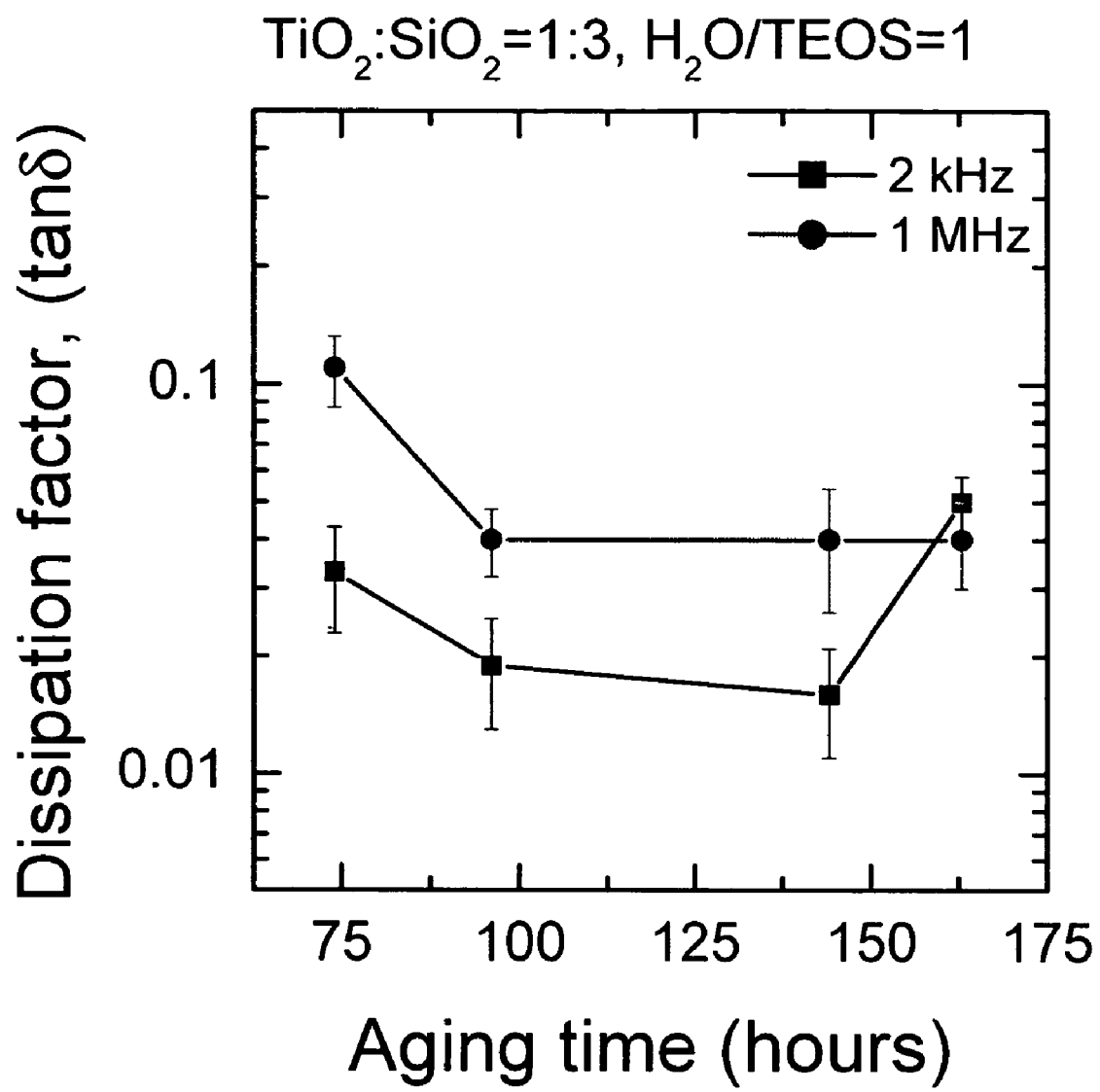
FIG. 33 shows the variation in dissipation factor with aging time at and 1 MHz for TiSiOx film with TiO2:SiO2=1:3.

FIG. 32 and FIG. 33 show the variation of dielectric constant and dissipation factor at 1 kHz and 1 MHz with various aging time. The average dielectric constant (excluding 23 hrs sample which shows dielectric constant ~41 at 1 MHz) is 10.5±1.5 at 1 MHz and 12±2 at 1 kHz. The dissipation factor of 0.03 at 1 MHz for the sol aged for 144 hrs and 0.08 for the sample aged for 74 hrs are obtained. The dissipation factor at 2 kHz is 0.02, which is lower than the value obtained at 1 MHz.

Figure 34:
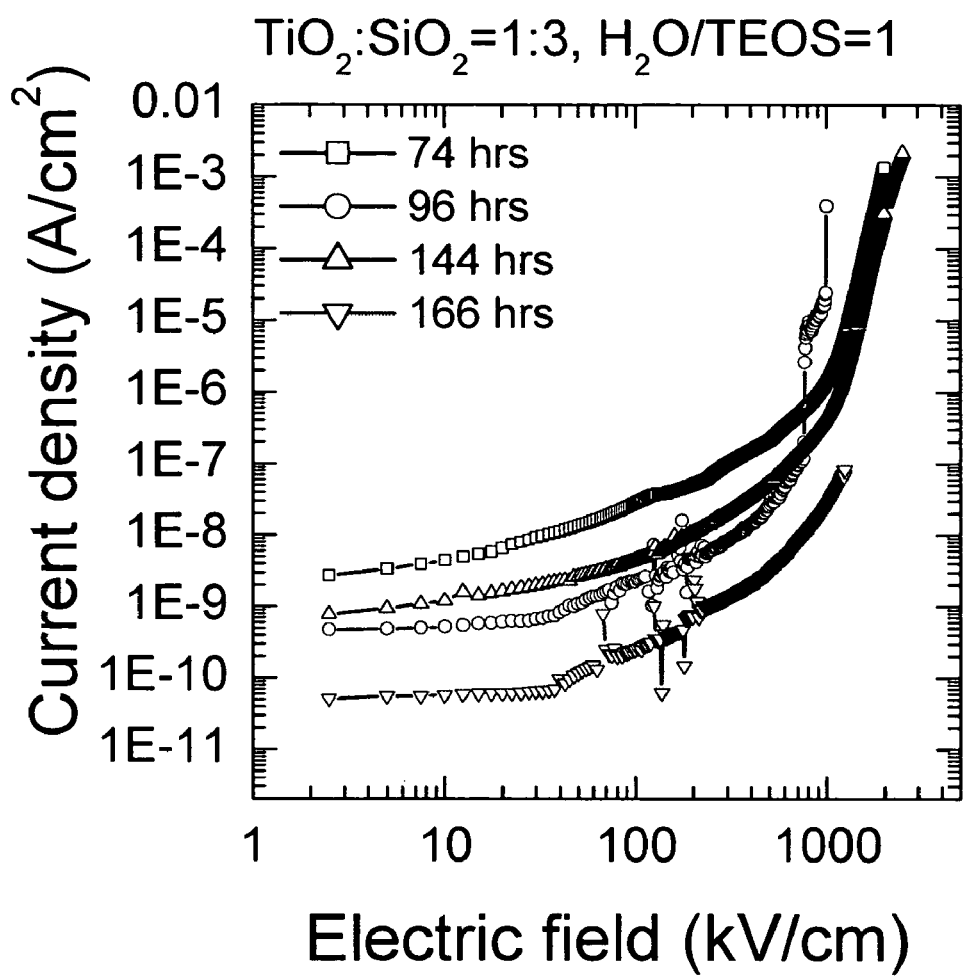
FIG. 34 shows the J-E characteristics of TiSi3Ox film with different aging times for TiSiOx film with TiO2:SiO2=1:3

FIG. 34 shows the variation of leakage current with the applied electric field for the films made from sols with different aging times. Leakage current density is very low as compared to the sample with TiO$_2$:SiO$_2$=1:1 and 3:1.

Figure 35:
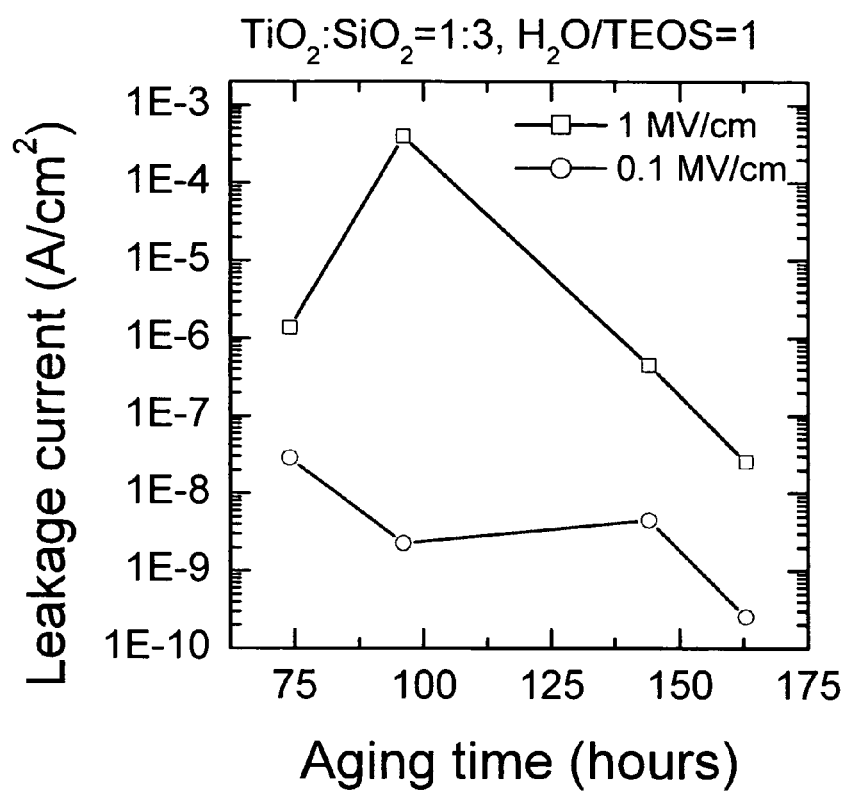
FIG. 35 shows the variation in leakage current density at 100 kV/cm electric field with different aging for TiSiOx films with TiO2:SiO2=1:3.

FIG. 35 shows the variation of leakage current with the aging time at the two different electric fields of 0.1 MV/cm and 1 MV/cm. The average leakage current for the films made from the sol aged between 96 hrs and 144 hrs is 3.6E-9 A/cm$^2$ at an electric field of 0.1 MV/cm. The low leakage current of 3E-8 A/cm$^2$ is obtained at 1 MV/cm field for the films obtained from the sol which has been aged for ~160 hrs.

It is important to note that the dielectric constant of the titanium silicate reduces from 20.5 to 10.5 by changing the ratio of TiO$_2$:SiO$_2$ from 1:1 to 1:3. This change of the composition is also concomitantly accompanied with a drastic reduction of the leakage current from ~5E-7 to ~3E-9 A/cm$^2$, at an electric field of 0.1 MV/cm. Even at an electric field of 1 MV/cm, a leakage current as low as 3E-8 A/cm$^2$ is obtained.

Role of SiO$_2$ on the Dielectric Constant and the Leakage Current of the Sol-gel Derived Titanium Silicate Films The dielectric constant is found to reduce with the amount of SiO$_2$ in the films. The table of FIG. 36 shows the variation of dielectric constant (K) and leakage current with SiO$_2$ proportion in the silicate films. (Leakage current at 1 MV/cm is only obtained for the sample with 66 molar % and 75 molar % SiO$_2$).

Figure 37:
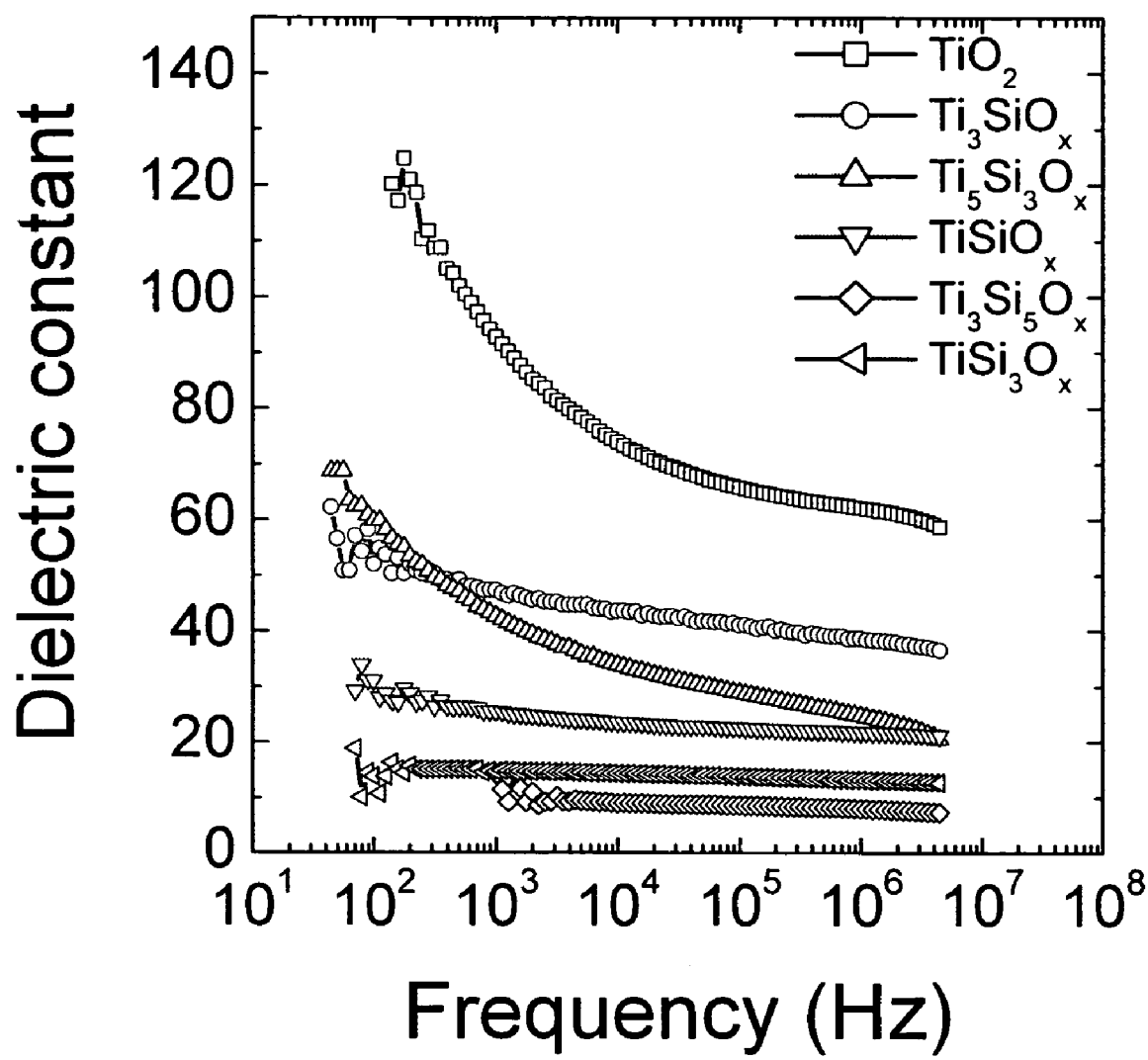
FIG. 37 shows the variation in dielectric constant with frequency for different silicate films.
Figure 38:
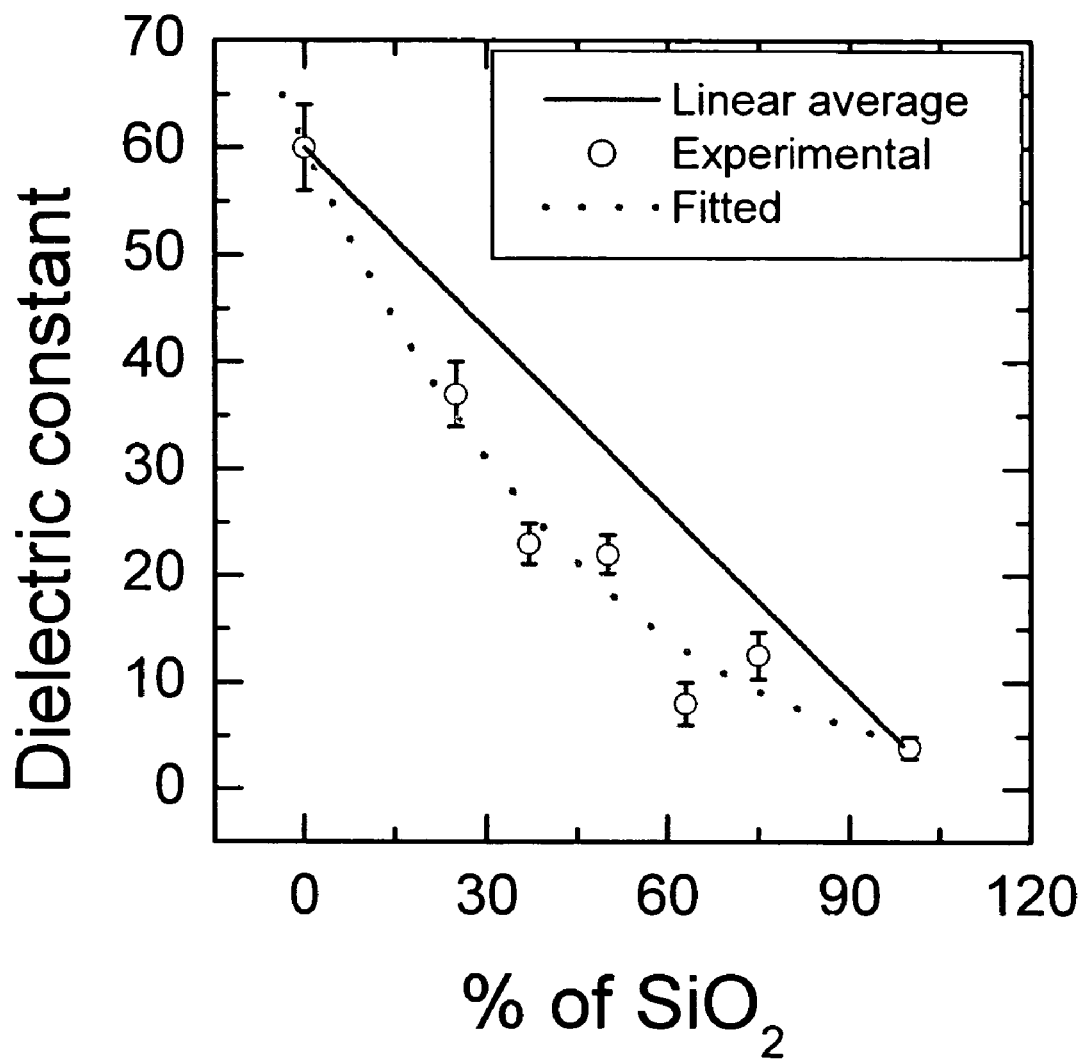
FIG. 38 shows variation in the leakage current density with applied electric field for different silicate films.

FIG. 37 shows the plots of dielectric constant as a function of frequency for the various film compositions. It is seen from the plots that the dielectric constant reduces with amount of SiO$_2$ in the films, at a given frequency. The dielectric constant of pure TiO$_2$ is found to be ~60. While adding 25 molar % SiO$_2$ in the films, the dielectric constant reduces to 38. The obtained dielectric constant is of about 21 when 50 molar % SiO$_2$ is added in the films. Dielectric constant further reduces to ~11 when the amount of SiO$_2$ increases to 75 molar % in the silicate films. This variation is summarized and plotted (red symbols) in FIG. 38. The blue straight line is the linear average of dielectric constant of the films as calculated from a linear interpolation between the two extremes materials (TiO$_2$ with a K=60 and SiO$_2$ with an assumed K of 3.9). The dotted line is the best fit of the experimental data points by the following polynomial equation $$K=60-1.3x+0.01x^2$$

where x is the molar % of SiO$_2$ in the film and K is the dielectric constant of the silicate films.

Figure 39:
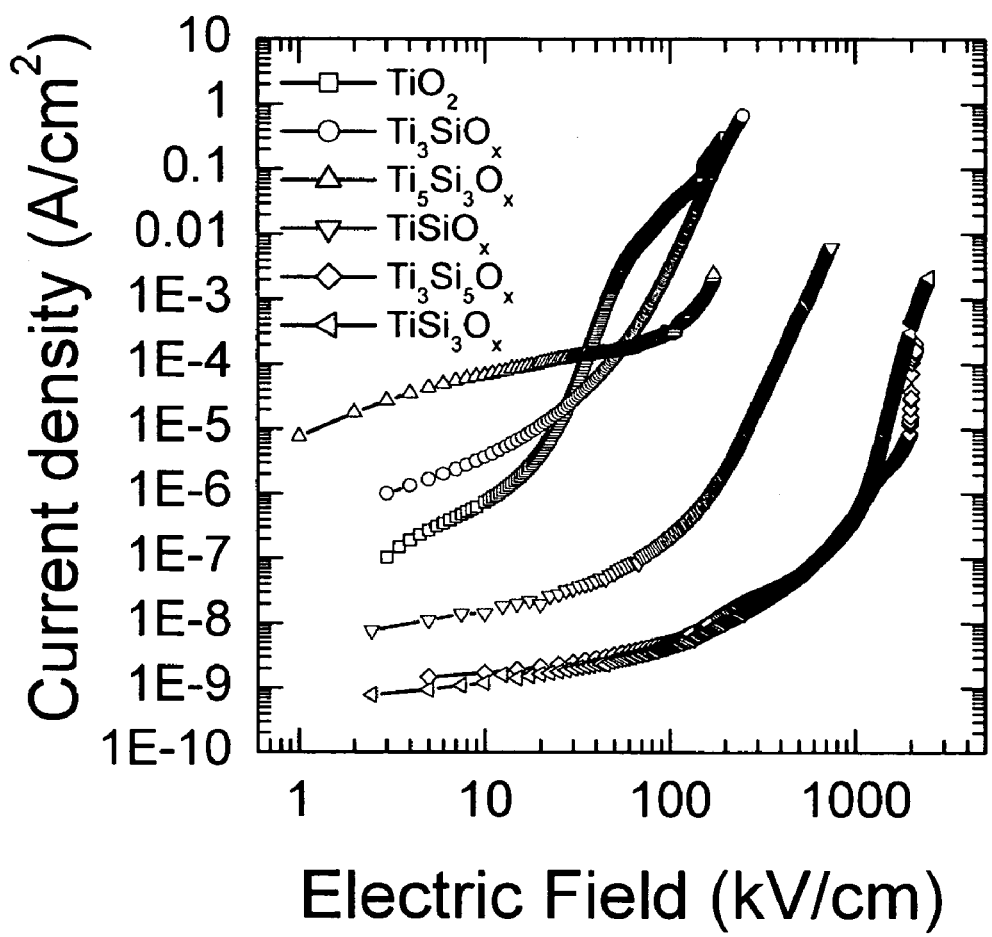
FIG. 39 shows the variation in the current density with the electrical field for silicate films with various amount of SiO$_2$ in the films.
Figure 40:
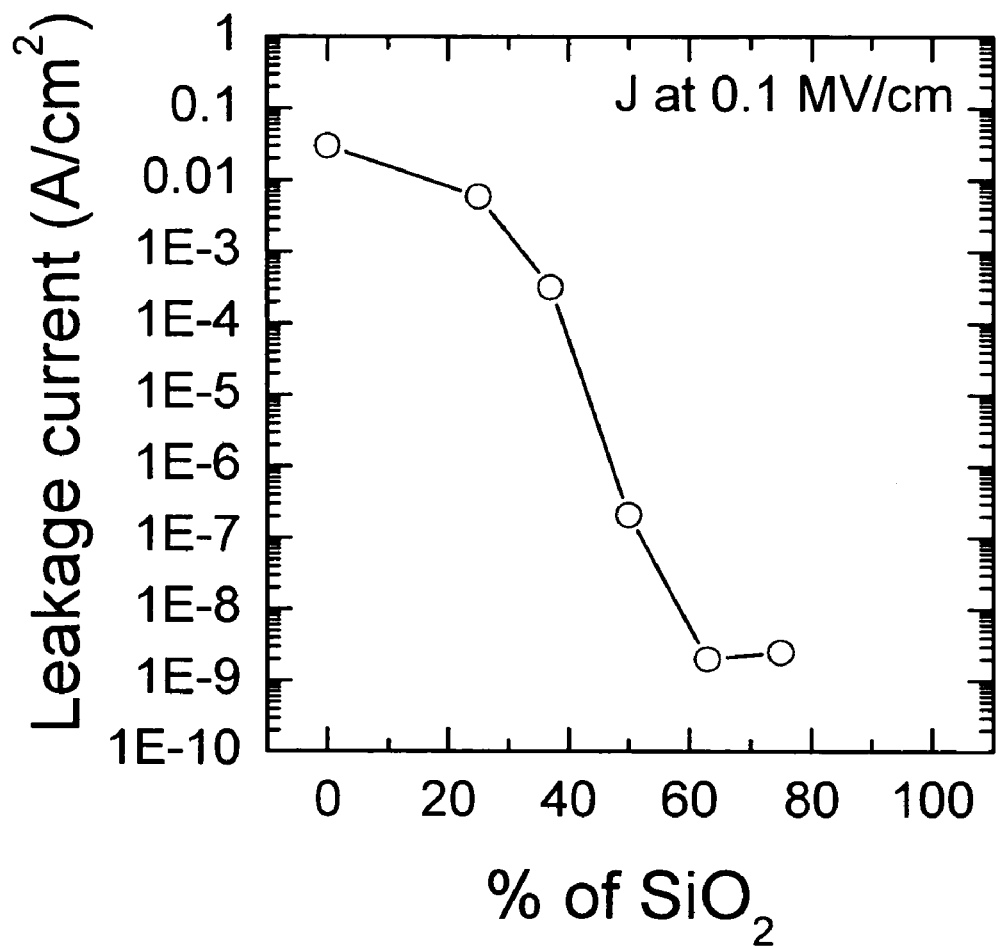
FIG. 40 shows the variation in leakage current for silicate films with various amount of SiO$_2$ in the films.

FIG. 39 shows the leakage current density with applied electric field for different silicate film compositions (the corresponding data at 0.1 MV/cm are also summarized in Table 3.3). The leakage current density obtained for TiO$_2$ is 30.2E-3 A/cm$^2$; while adding 25 molar % SiO$_2$ in the film, leakage current density reduces to 5.9E-3 A/cm$^2$. Leakage current density further reduces to 2.10E-7 A/cm$^2$ after adding 50 molar % SiO$_2$ in the silicate films. Minimum leakage current of 2.5E-9 A/cm$^2$ is obtained after adding 66 molar % SiO$_2$ in the films (FIG. 40). At 1 MV/cm, the leakage current density was as low as 4.3E-7 A/cm$^2$ and remains constant for the further addition of SiO$_2$ up to 75%.

It will be seen that the titanium silicates in accordance with embodiments of the invention:

Are deposited by the spin-on sol-gel technique using tetrabutoxytitanium (TBOT, Ti(OC$_4$H$_9$)$_4$), and tetramethoxysilane (TEOS, Si(OC$_2$H$_5$)$_4$) as precursors;

Are annealed after deposition at temperatures between 500° C. and 700° C. in an oxygen containing atmosphere;

Have a (SiO$_2$)$_x$(TiO$_2$)$_{1-x}$ composition ranging between 0.50<x<0.75 (i.e.

SiO$_2$:TiO$_2$ ranging between 1:1 and 3:1;

Have a dielectric constant ranging between 10–50 at frequencies ranging between 1 kHz and 1 MHz;

Have a dissipation factor ranging between 0.001 and 0.1 at frequencies ranging between 1 kHz and 1 MHz; and Have a leakage current ranging between 1 nA/cm$^2$ and 1 μA/cm$^2$ at an applied field ranging between 0.1 MV/cm and 1 MV/cm.

The contents of all references referred to above are herein incorporated by reference.

It will be appreciated that many variants of the invention will be apparent to persons skilled in the art without departing from the spirit of the invention.

We claim:

1. In a method of making a capacitor in an integrated device, wherein said capacitor includes a dielectric film with a high dielectric constant, the improvement wherein said dielectric film is made by a sol-gel process, said dielectric film has a composition (SiO$_2$)$_x$(TiO$_2$)$_{1-x}$, where 0.50<x<0.75, said dielectric film is applied to a substrate using a spin-on technique, and the resulting film is annealed in an oxygen-containing atmosphere.

2. A method as claimed in claim 1, wherein the resulting film is annealed at a temperature lying in the range of about 500° C. to 700° C.

3. A method as claimed in claim 2, wherein said spin-on sol-gel process uses as precursors for said film tetrabutyloxytitanium (TBOT) and tetramethoxysilane (TEOS).

4. A method as claimed in claim 3, wherein said precursors are diluted with C$_2$H$_5$OH.

5. A method as claimed in claim 4, wherein said sol-gel process is carried out in the presence of an acid.

6. A method as claimed in claim 5, wherein said sol-gel process has aging time of between about 70 and 100 hours.

7. A method as claimed in claim 6, wherein said annealing temperature is about 600° C.

8. In a method of making a capacitor in an integrated device, wherein said capacitor includes a dielectric film with a high dielectric constant, the improvement wherein said dielectric film is a titanium silicate film, and wherein said dielectric film is made by:

mixing precursors for said titanium silicate film to create a sol, said precursors being selected to form titanium silicate having a composition (SiO$_2$)$_x$(TiO$_2$)$_{1-x}$, where 0.50<x<0.75;

forming a gel from said sol;

applying said gel to a substrate using a spin-on technique to form a coating;

drying said coating to form said titanium silicate film; and annealing said titanium silicate film in an oxygen-containing atmosphere.

9. A method as claimed in claim 8, wherein said titanium silicate film is annealed at a temperature lying in the range of about 500° C. to 700° C.

10. A method as claimed in claim 9, wherein said precursors are tetrabutyloxytitanium (TBOT) and tetramethoxysilane (TESO).

11. A method as claimed in claim 10, wherein said sol is diluted with C$_2$H$_5$OH to control viscosity.

12. A method as claim 10, wherein prior to mixing said precursors, said tetramethoxysilane is mixed with an organic solvent and a gel promoter.

13. A method as claimed in claim 12, wherein the gel promoter is an acid.

14. A method as claimed in claim 13, wherein said acid is HCl.

15. A method as claimed in claim 12, wherein said sol is allowed to age for a time sufficient to form said gel, and said aging time is controlled to select the desired characteristics in the resulting titanium silicate film.

16. A method as claimed in claim 15, wherein said gel promoter is an acid and said aging time is between about 70 and 100 hours.

17. A method as claimed in claim 8, wherein said titanium silicate film provides a dielectric layer in a device selected from the group consisting of: a CMOS device, a high-voltage CMOS device, and an intelligent MEMS device.

18. In a method of making an integrated circuit device incorporating a film having a dielectric constant of between 10 and 50 at frequencies between 1 kHz and 1 MHz, comprising:

using a spin-on sol-gel process to deposit said film on a substrate forming part of said integrated device, said film having a composition $(SiO_2)_x(TiO_2)_{1-x}$, where $0.50<x<0.75$; and annealing the resulting film in an oxygen-containing atmosphere at a temperature lying in the range of about 500° C. to 700° C.

19. A method as claimed in claim 18, wherein said spin-on sol-gel process uses as precursors for said film tetrabutyloxytitanium (TBOT) and tetramethoxysilane (TEOS).

20. A method as claimed in claim 19, wherein said precursors are diluted with $C_2H_5OH$.

21. In a method of making an integrated device incorporating a film with high dielectric constant, the improvement wherein said film is made by:

mixing tetrabutyloxytitanium (TBOT) and tetramethoxysilane (TEOS) precursors to form a sol;

transforming said sol into a gel;

spin coating said gel onto a substrate to form a titanium silicate film having a composition $SiO_2)_x(TiO_2)_{1-x}$, where $0.50<x<0.75$; and annealing said titanium silicate film in an oxygen-containing atmosphere at a temperature lying in the range of about 500° C. to 700° C.

22. A method as claimed in claim 21, wherein said gel is aged in the presence of an acid for about 70–100 hours.

* * * * *